(12) United States Patent
Brown

(10) Patent No.: US 9,875,023 B2
(45) Date of Patent: Jan. 23, 2018

(54) DIAL-BASED USER INTERFACES

(75) Inventor: David William Brown, Reading (GB)

(73) Assignee: Microsoft Technology Licensing, LLC, Redmond, WA (US)

( * ) Notice: Subject to any disclaimer, the term of this patent is extended or adjusted under 35 U.S.C. 154(b) by 433 days.

(21) Appl. No.: 13/303,140

(22) Filed: Nov. 23, 2011

(65) Prior Publication Data

US 2013/0127911 A1    May 23, 2013

(51) Int. Cl.
*G06F 3/0488* (2013.01)

(52) U.S. Cl.
CPC ................................. *G06F 3/04886* (2013.01)

(58) Field of Classification Search
CPC ............... G06F 3/0412; G06F 3/04883; G06F 3/04815; G06F 3/04845; G06F 3/0416; G06F 3/04886
USPC .......................................................... 715/834
See application file for complete search history.

(56) References Cited

U.S. PATENT DOCUMENTS

| | | | |
|---|---|---|---|
| 7,653,883 B2 | 1/2010 | Hotelling et al. | |
| 7,743,348 B2 | 6/2010 | Robbins et al. | |
| 7,864,161 B2* | 1/2011 | Hollemans et al. | 345/173 |
| 7,992,102 B1* | 8/2011 | De Angelo | 715/834 |
| 2006/0092177 A1 | 5/2006 | Blasko | |
| 2008/0186808 A1* | 8/2008 | Lee | 368/10 |
| 2009/0066728 A1 | 3/2009 | Ording | |
| 2009/0187860 A1* | 7/2009 | Fleck et al. | 715/834 |
| 2010/0197353 A1* | 8/2010 | Marui et al. | 455/566 |
| 2010/0299637 A1* | 11/2010 | Chmielewski et al. | 715/834 |
| 2010/0333030 A1* | 12/2010 | Johns | 715/834 |
| 2011/0148791 A1* | 6/2011 | Luu | 345/173 |
| 2012/0066629 A1* | 3/2012 | Lee et al. | 715/769 |
| 2013/0104079 A1* | 4/2013 | Yasui | G06F 3/0482 715/834 |

OTHER PUBLICATIONS

Kiriaty, Yochay, "MultiTouch Capabilities in Windows 7", Retrieved at <<http://msdn.microsoft.com/en-us/magazine/ee336016.aspx>>, Aug. 2009, pp. 7.
"VoiceOver", Retrieved at <<http://www.apple.com/accessibility/itunes/ipodtouch.html, Retrieved Date: Aug. 30, 2011, pp. 4.

(Continued)

*Primary Examiner* — Jennifer To
*Assistant Examiner* — Terri Filosi
(74) *Attorney, Agent, or Firm* — Arent Fox LLP

(57) ABSTRACT

Concepts and technologies are described herein for dial-based user interfaces. In accordance with the concepts and technologies disclosed herein, a user device presents a dial-based user interface. The dial-based user interface can be configured with user interface controls associated with various options. In response to detecting selection of a user interface control associated with an option having a numeric value, the user device can modify the dial-based user interface to present a numeric adjustment control that can be interfaced with by a user to adjust the numeric value associated with the option. The dial-based user interface also can be modified to show selected options, option states, option values, option selection history, and/or other information.

20 Claims, 15 Drawing Sheets

(56) References Cited

OTHER PUBLICATIONS

Wang, et al., "Detecting and Leveraging Finger Orientation for Interaction with Direct-Touch Surfaces", Retrieved at <<http://research.microsoft.com/en-us/people/xiangc/uist2009_fingerorientation.pdf>>, Proceedings of the 22nd annual ACM symposium on User interface software and technology (UIST), Oct. 4-7, 2009, pp. 23-32.

"HTC Touch Dual™", Retrieved at <<http://www.india-cellular.com/Review-HTC-Touch-Dual.htm>>, Retrieved Date: Aug. 30, 2011, pp. 3.

\* cited by examiner

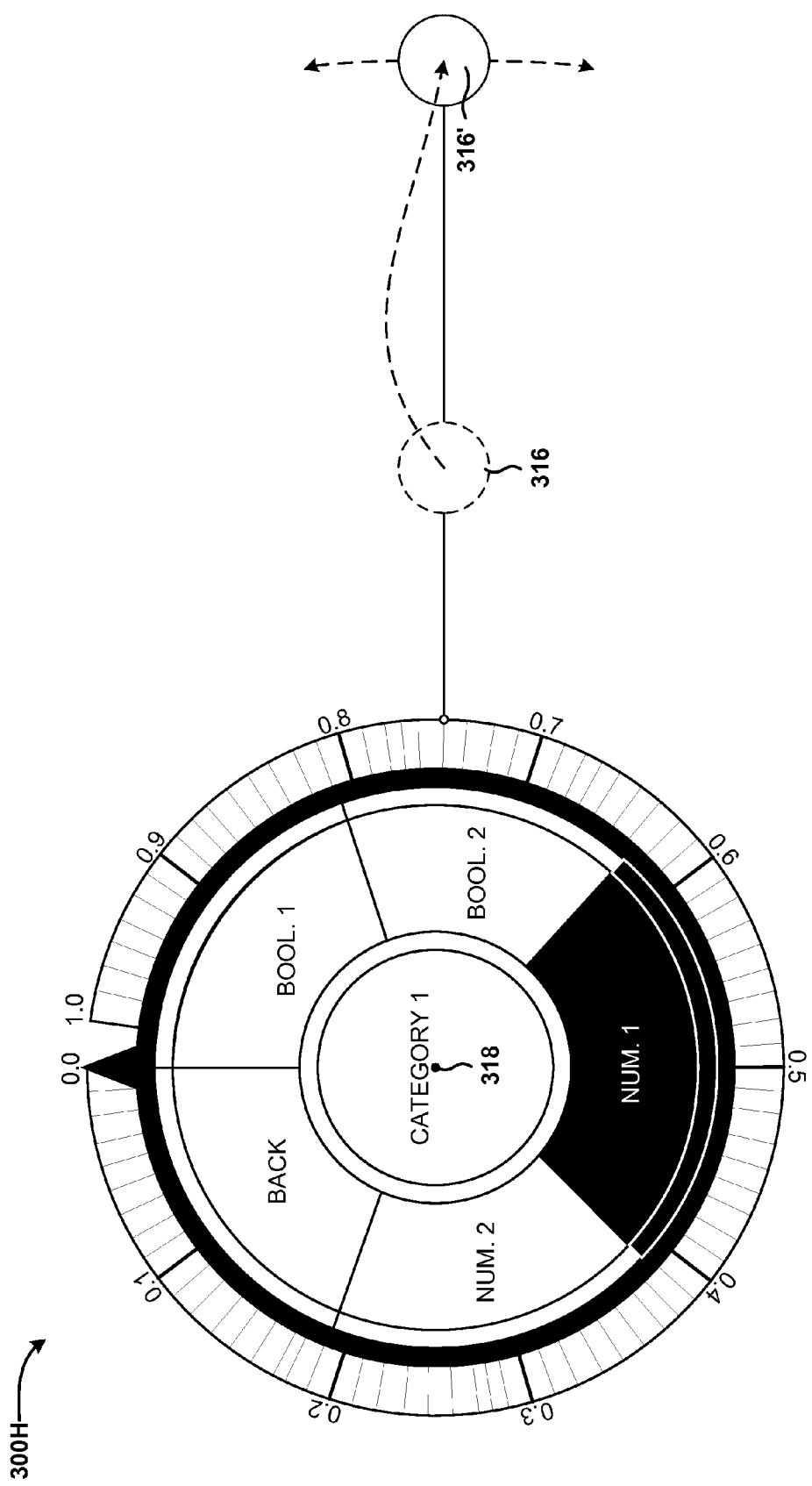

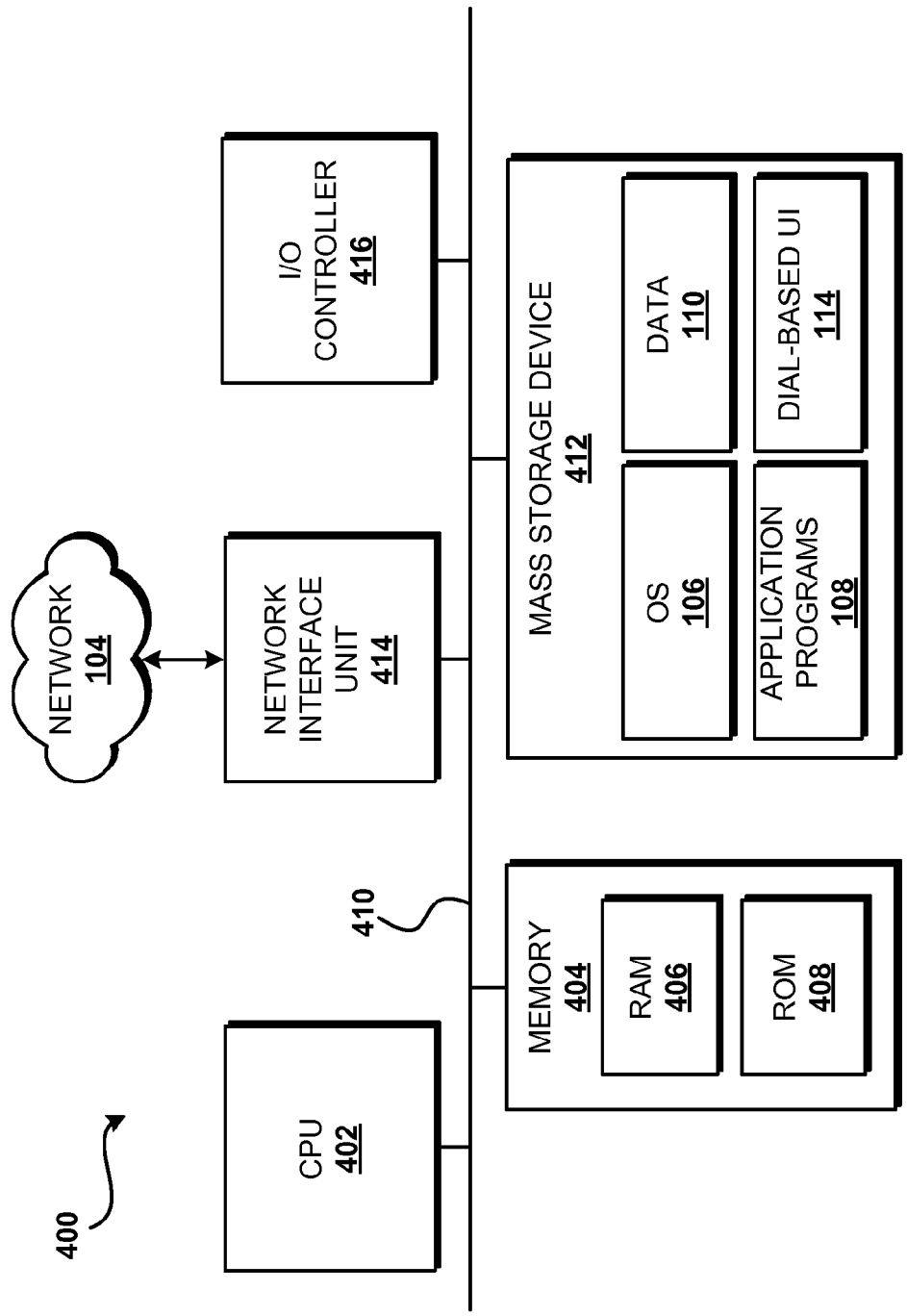

DIAL-BASED USER INTERFACES

BACKGROUND

Devices with touch-sensitive displays or input devices may respond to user commands received via one or two touch points or other contact points ("contact points"). Determining intended input and/or commands from one or two contact points can be challenging for several reasons. For example, movements of a single contact point may be difficult to interpret as there may be no reference point associated with the movement. A movement of a contact point in a substantially straight line may be caused by a stray contact, by an intended straight line, by an intended curved line, and/or other inputs. Similarly, movements of two touch points can suffer from diminished accuracy for the same reasons.

Another challenge faced by implementing touch controls is that some user interfaces such as smart phones, tablet computers, and the like, often provide a limited amount of display and/or input device real estate. Thus, compact devices that support touch-based interactions with users often are limited to simple gestures such as pinches, swipes, flicks, and the like. Because of the limited real estate available on these devices, a multi-touch command may not be properly interpreted because a finger or fingers of a user may lose contact with a touch-sensitive device due to space limitations or for other reasons.

Human beings often interact with physical switches or other controls using all available digits for added control, accuracy, and/or strength. For example, a human may use all five fingers of a hand to open a door knob, notwithstanding an ability to open a door knob with one or two fingers, due to an increased level of control and strength that may be gained by using all five fingers. As such, using more than two fingers to implement commands on touch-sensitive devices can enhance a user's sense of control and precision, though such control and/or precision may not be necessary and/or may not be measured by the input device.

It is with respect to these and other considerations that the disclosure made herein is presented.

SUMMARY

Concepts and technologies are described herein for dial-based user interfaces. In accordance with the concepts and technologies disclosed herein, a device such as a user device presents a dial-based user interface for interacting with application programs, data, and/or external resources such as web pages, applications, and the like. The dial-based user interface can be configured with a number of soft buttons associated with various options, web or other resource addresses, categories or sub categories, sub menus and/or menus, combinations thereof, and the like. The options can include various types of options including, but not limited to, options having an associated numeric value.

If the user device detects selection of a soft button, the user device can determine if the soft button is associated with an option having a numeric value. If so, the user device can modify the dial-based user interface to present a numeric adjustment control. The numeric adjustment control can be interfaced with by a user to adjust the numeric value associated with the option in a natural, precise, efficient, and compact manner. The dial-based user interface also can be modified to show selected options, option states, option values, option selection history, and/or other information. The dial-based user interface also can be modified to show contact points, anchor points, and the like during adjustment of the numeric values.

According to one aspect, a user device executes application programs for accessing or interacting with local or remote data. The user device also is configured to provide a dial-based user interface for interacting with the data, applications, and/or other resources. The dial-based user interface presents options in a compact and easy to use interface that can be implemented in devices with limited display or input device real estate. The dial-based user interface also includes indicators for indicating focus state, option selection state, option values, and/or option selection history information.

According to another aspect, if an option having a numeric value is selected via the dial-based interface, the dial-based interface is modified to present a numeric adjustment control. Input from the user is detected by the user device, analyzed to determine a command associated with the input, and implemented with respect to the numeric value. According to various implementations, the user interacts with the dial-based user interface using touch inputs.

According to another aspect, the user device is configured to interpret various types of touch or other inputs and to implement the determined commands. The touch inputs can include touch and drag gestures, multi-touch and rotate gestures, touch, slide, and drag gestures, and/or pivot and rotate gestures. These and other gestures can be identified by the user device and implemented via the dial-based user interface. The dial-based user interface thus can be configured to support natural human gestures, even with limited input device real estate.

It should be appreciated that the above-described subject matter may be implemented as a computer-controlled apparatus, a computer process, a computing system, or as an article of manufacture such as a computer-readable storage medium. These and various other features will be apparent from a reading of the following Detailed Description and a review of the associated drawings.

This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

BRIEF DESCRIPTION OF THE DRAWINGS

FIGS. 3A-3M are user interface diagrams showing aspects of user interfaces for interacting with dial-based user interfaces, according to various illustrative embodiments.

FIG. 4 is a computer architecture diagram showing an illustrative computer hardware and software architecture for a computing system capable of implementing aspects of the embodiments presented herein.

DETAILED DESCRIPTION

Figure 1:
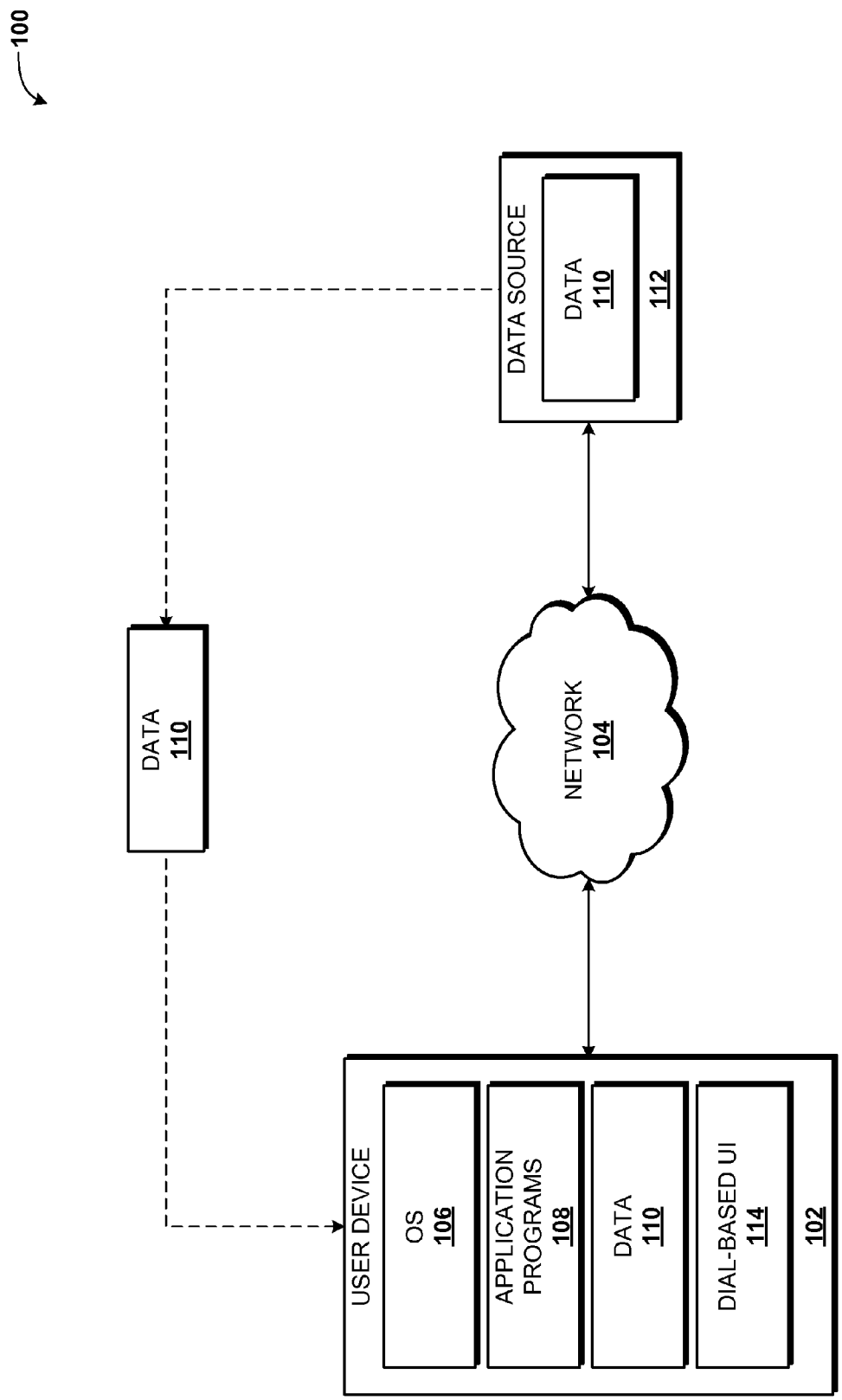
FIG. 1 is a system diagram illustrating an illustrative operating environment for various embodiments of the concepts and technologies disclosed herein.

The following detailed description is directed to concepts and technologies for dial-based user interfaces. According to the concepts and technologies described herein, a user device presents a dial-based user interface for interacting with application programs, data, and/or external resources such as web pages, applications, and the like. The dial-based user interface can be configured with soft buttons or other user interface controls that can be associated with various options. The options can include, for example, options for navigating to web or other resource addresses, options for accessing command categories or sub categories, options for accessing sub menus and/or menus, options for setting Boolean values, options for setting numeric values, and the like.

In response to detecting selection of a user interface control associated with an option having a numeric value, the user device can modify the dial-based user interface to present a numeric adjustment control. The numeric adjustment control can be interfaced with by a user to adjust the numeric value associated with the option. The dial-based user interface also can be modified to show selected options, option states, option values, option selection history, and/or other information. The dial-based user interface also can be modified to show contact points, anchor points, and the like during adjustment of the numeric values.

While the subject matter described herein is presented in the general context of program modules that execute in conjunction with the execution of an operating system and application programs on a computer system, those skilled in the art will recognize that other implementations may be performed in combination with other types of program modules. Generally, program modules include routines, programs, components, data structures, and other types of structures that perform particular tasks or implement particular abstract data types. Moreover, those skilled in the art will appreciate that the subject matter described herein may be practiced with other computer system configurations, including hand-held devices, multiprocessor systems, microprocessor-based or programmable consumer electronics, minicomputers, mainframe computers, and the like.

In the following detailed description, references are made to the accompanying drawings that form a part hereof, and in which are shown by way of illustration specific embodiments or examples. Referring now to the drawings, in which like numerals represent like elements throughout the several figures, aspects of a computing system, computer-readable storage medium, and computer-implemented methodology for supporting interactions with dial-based user interfaces will be presented.

Referring now to FIG. 1, aspects of one operating environment 100 for the various embodiments presented herein will be described. The operating environment 100 shown in FIG. 1 includes a user device 102. In some embodiments, the user device 102 operates as part of, or in communication with, a communications network ("network") 104, though this is not necessarily the case. According to various embodiments, the functionality of the user device 102 is provided by a personal computer ("PC") such as a desktop, tablet, or laptop computer system. In other embodiments, the functionality of the user device 102 is provided by other types of computing systems including, but not limited to, a handheld computer, a netbook computer, an embedded computer system, a personal digital assistant ("PDA"), a mobile telephone, a smart phone, or another computing device. Thus, while the functionality of the user device 102 is described herein as being provided by a PC having a multi-touch-sensitive display, it should be understood that this embodiment is illustrative, and should not be construed as being limiting in any way.

The user device 102 can be configured to execute an operating system 106 and one or more application programs 108. The operating system 106 is a computer program for controlling the operation of the user device 102. The application programs 108 are executable programs configured to execute on top of the operating system to provide various functions. According to various implementations, the application programs 108 include, but are not limited to, web browsing programs, stand-alone applications, multimedia software, other applications, and the like. The application programs 108 are configured to receive or store data 110 and/or to execute various operations with respect to the data 110.

In some implementations, the data 110 is stored at the user device 102 in a memory or other data storage device associated with the user device 102. In other embodiments, the data 110 is obtained from a data source 112 that is operating as part of, or in communication with, the network 104. The data source 112 can be a network-connected hard drive, a server computer operating on the network 104 or in communication therewith, and/or any other device that can store or host the data 110 and/or communicate with the user device 102. The data 110 can be received at and/or imported by the application programs 108 for various purposes. For example, the data 110 can correspond to a text document, and the data 110 can be received at and/or imported by the application programs 108 for editing or saving. It should be understood that this embodiment is illustrative, and should not be construed as being limiting in any way.

The user device 102 also is configured to store one or more dial-based user interfaces ("dial-based UIs") 114. The dial-based UIs 114 include, in various embodiments, computer-executable code that, when executed by the user device 102, causes the user device 102 to present a user interface for interacting with the user device 102, with an application program 108 executed by the user device 102, or with other applications or resources viewed at or with the user device 102. Various embodiments of the dial-based UIs 114 are illustrated and described below with reference to FIGS. 3A-3M. Briefly, the dial-based UIs 114 can include dial-based menus, soft buttons, and/or other types of interfaces for controlling various functionality of the application programs 108, for interacting with the data 110, and/or for interacting with or controlling other applications or resources.

In some embodiments, the dial-based UIs 114 present navigation options or other options on soft buttons. The soft buttons can be arranged radially around the dial-based UIs 114 and/or can include a soft button for presenting a root menu option. The dial-based UIs 114 also can include various indicator areas, regions, or rings for indicating selection states of the soft buttons, selection history associated with the soft buttons, states associated with functionality accessed via the soft buttons, and/or other functionality. In one contemplated embodiment, selection of a soft button corresponding to a navigation option causes the user device 102 to modify the dial-based UIs 114 to provide functionality, navigation options, and/or other options associated with the navigation option selected.

The dial-based UIs 114 also are configured to provide functionality for selecting or de-selecting functionality and/or adjusting values or settings associated with various controls. In one contemplated embodiment, a soft button is presented on the dial-based UIs 114 to adjust a numeric value such as a brightness setting, a volume, an age, or any other value that can be adjusted through or across a numerical range. The numerical range can include negative numbers, decimal values, fractions, and/or any other representation of numbers or other ranges of values.

In response to detecting a selection of the soft button, the user device 102 can modify the dial-based UIs 114 to present additional or alternative UI controls for adjusting the numeric value. In one embodiment, illustrated and described below with reference to FIGS. 3G-3M, the user device 102 present a scale that can be rotated by a user via a user interface device such as a mouse, stylus, or other device, via touch and/or multi-touch gestures on a touch-sensitive display, via voice commands, keystroke commands, and/or gestures in free space, and/or via other input. Because selection of an option associated with a numerical value does not necessarily result in modification of the dial-based UIs 114, it should be understood that this embodiment is illustrative, and should not be construed as being limiting in any way.

In some embodiments, the dial-based UIs 114 are interacted with via touch gestures and/or multi-touch gestures. The touch gestures are measured by the user device 102 and interpreted by the dial-based UIs 114 based upon location of the gestures, a determined rotation axis of the gestures, a determined radius between the rotation axis and the contact point or points measured by the dial-based UIs 114, a movement speed, and/or other aspects of the gestures. Based upon these and other factors, the user device 102 can determine a movement intended by the user and implement a command intended by the movement at the user device 102.

In one implementation, the dial-based UIs 114 are controlled via a single-touch-and-drag gesture. In this gesture, a user taps or touches a touch-sensitive screen or other touch-sensitive interface ("screen") with a finger or other appendage ("finger") and drags, slides, or otherwise moves his or her finger while in contact with the screen. The user device 102 can interpret this gesture as an input for adjusting a value associated with the dial-based UIs 114. In interpreting this command, the user device 102 can interpret the movement as occurring around a rotation axis located at the center of the dial-based UIs 114, or elsewhere, and implement a rotate command according to the measured angle of rotation determined by the tracked movement. It should be understood that this embodiment is illustrative, and should not be construed as being limiting in any way.

In another implementation, the dial-based UIs 114 are controlled via a multi-touch-and-rotate gesture. In this gesture, a user taps or touches a touch-sensitive screen with two or more fingers and rotates the fingers around a rotation axis. The user device 102 can interpret this gesture as an input for adjusting a value associated with the dial-based UIs 114. In interpreting this command, the user device 102 determines a rotation axis about which the two or more fingers are rotated and measures a rotation angle through which the rotation occurs. In some embodiments, the user device 102 implements the measured rotation as if occurring about a rotation axis located at a midpoint between the two contact points, at the center of the dial-based UIs 114, or elsewhere, and implements a rotate command in accordance with the measured rotation. It should be understood that this embodiment is illustrative, and should not be construed as being limiting in any way.

In another implementation, the dial-based UIs 114 are controlled via a touch-slide-and-drag gesture. In this gesture, a user begins with a gesture that is substantially similar to the single-touch-and-drag gesture described above. As such, a user can begin by tapping or touching a touch-sensitive screen with one or more fingers and drags, slides, or otherwise moves his or her finger while in contact with the screen. Before, during, or after dragging the finger to rotate the dial-based UIs 114, the user slides one or more fingers away from a rotation axis, thereby increasing a radius measured from the rotation axis to one or more of the contact points. The user device 102 can interpret this gesture as an input for launching a precision rotation mode. In some embodiments, the user device 102 implements the precision rotation mode by increasing the radius to the new contact point and implementing the movement of the finger as a rotation about the rotation axis located at the center of the dial-based UIs 114, or elsewhere. Because the radius is increased via this command, a movement of the finger applies a slower rotation of the dial-based UIs 114, thereby enabling precision adjustment of a value adjusted via the dial-based UIs 114.

Figure 3A:
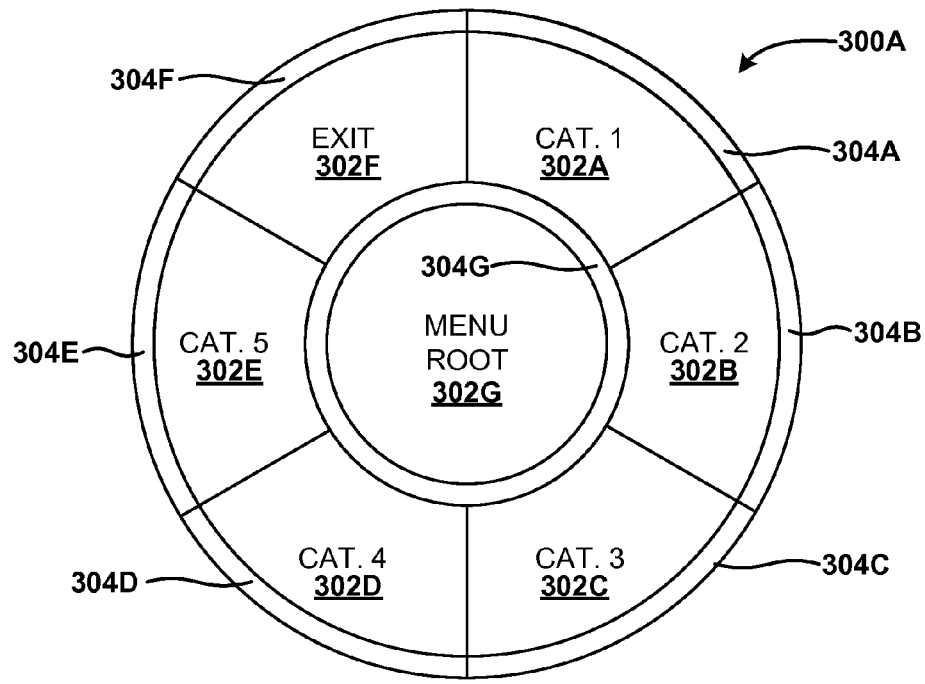

In yet another implementation, the dial-based UIs 114 are controlled via a pivot-and-rotate gesture. In this gesture, a user taps or touches a touch-sensitive screen with a first finger, touches the touch-sensitive screen with as second finger, and drags, slides, or otherwise moves the second finger while in contact with the screen and while holding the first finger stationary. The user device 102 can interpret this gesture as an input for adjusting a value associated with the dial-based UIs 114. In interpreting this command, the user device 102 can interpret the movement as occurring around a rotation axis located at center of the dial-based UIs 114, or elsewhere, and implement a rotate command. In measuring the movement, however, the user device 102 applies a radius measured from the first finger to the second finger and applies the rotation of the second finger as measured around the first finger as the rotation axis. Thus, the pivot-and-rotate gesture can be used for precision rotation of the dial-based UIs 114. This approach to precision rotation of the dial-based UIs 114 can be useful, for example, when a device has limited real estate for supporting large rotation radii, though other applications are contemplated and are possible. An example of this gesture is shown in FIG. 3L. It should be understood that this embodiment is illustrative, and should not be construed as being limiting in any way.

In other implementations, the dial-based UIs 114 are configured to present one or more dial-based menus or other interfaces ("dial-based menus"). Users can interact with the one or more dial-based menus simultaneously. In one embodiment, the user device 102 displays two dial-based menus that are configured for simultaneous control by two hands of a user. Thus, scales of the two dial-based menus can be, but are not necessarily, configured for rotation in opposite directions. For example, a first dial-based menu can be configured for rotation in a counter-clockwise direction to increase a numeric value and a second dial-based menu can be configured for rotation in a clockwise direction to increase a numeric value. Because these and other aspects of the dial-based UIs 114 can be configured by users or software, it should be understood that these embodiments are illustrative, and should not be construed as being limiting in any way.

FIG. 1 illustrates one user device 102, one network 104, and one data source 112. It should be understood, however, that some implementations of the operating environment 100 include multiple user devices 102, multiple networks 104, and no or multiple data sources 112. Thus, the illustrated embodiments should be understood as being illustrative, and should not be construed as being limiting in any way.

Figure 2:
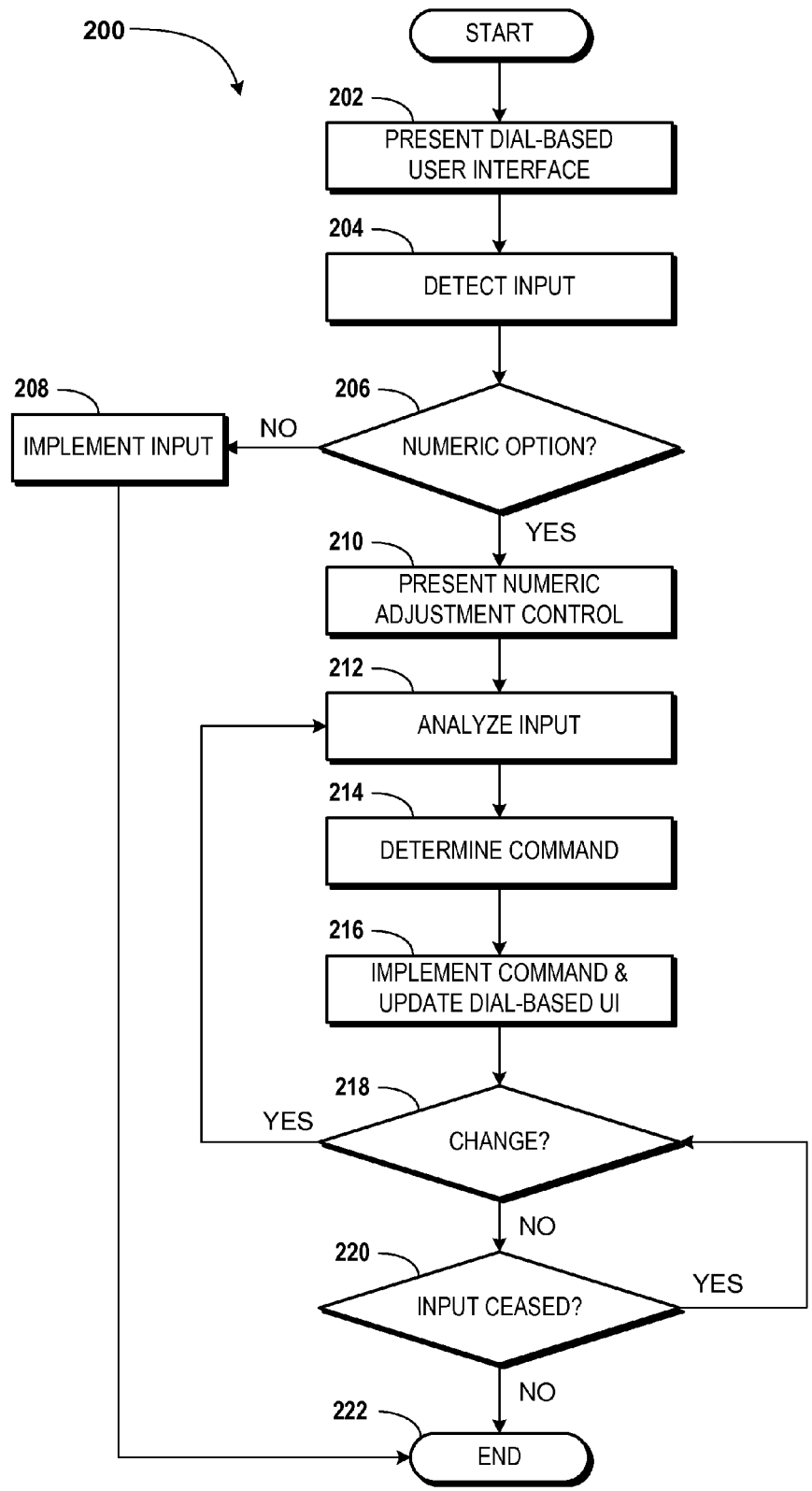
FIG. 2 is a flow diagram showing aspects of a method for supporting interactions with dial-based user interfaces, according to an illustrative embodiment.

Turning now to FIG. 2, aspects of a method 200 for supporting interactions with dial-based user interfaces will be described in detail, according to an illustrative embodiment. It should be understood that the operations of the method 200 disclosed herein are not necessarily presented in any particular order and that performance of some or all of the operations in an alternative order(s) is possible and is contemplated. The operations have been presented in the demonstrated order for ease of description and illustration. Operations may be added, omitted, and/or performed simultaneously, without departing from the scope of the appended claims.

It also should be understood that the illustrated method 200 can be ended at any time and need not be performed in its entirety. Some or all operations of the method 200, and/or substantially equivalent operations, can be performed by execution of computer-readable instructions included on a computer-storage media, as defined herein. The term "computer-readable instructions," and variants thereof, as used in the description and claims, is used expansively herein to include routines, applications, application modules, program modules, programs, components, data structures, algorithms, and the like. Computer-readable instructions can be implemented on various system configurations, including single-processor or multiprocessor systems, minicomputers, mainframe computers, personal computers, hand-held computing devices, microprocessor-based, programmable consumer electronics, combinations thereof, and the like.

Thus, it should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These operations, structural devices, acts, and modules may be implemented in software, in firmware, in special purpose digital logic, and any combination thereof.

For purposes of illustrating and describing the concepts of the present disclosure, the method 200 disclosed herein is described as being performed by the user device 102 via presentation of the dial-based UI 114 and/or execution of the application programs 108. Thus, it should be understood that the dial-based UIs 114 can be provided by a web server or other data source 112 and rendered at the user device 102 for interaction by the user. As such, it should be understood that the described embodiments, wherein the dial-based UIs 114 are provided by the user device 102, are illustrative and therefore should not be viewed as being limiting in any way.

The method 200 begins at operation 202, wherein the user device 102 presents a dial-based UI 114. According to various embodiments, the dial-based UI 114 is presented as a screen overlay for one or more of the application programs 108. Thus, for example, the dial-based UI 114 can be provided by the user device 102 to interact with data 110 generated or obtained by the user device 102 during interactions with the application programs 108 and/or remote applications or other resources. The dial-based UI 114 can be presented as radially arranged soft buttons, as a circular interface with one or more UI controls, and/or as configured in the examples illustrated and described below with reference to FIGS. 3A-3M.

From operation 202, the method 200 proceeds to operation 204, wherein the user device 102 detects input. According to various implementations, the input detected in operation 204 includes, but is not necessarily limited to, a touch detected at a touch-sensitive display or other input device such as a touchpad, a multi-touch input detected at a multi-touch sensitive display or other input device, a mouse button click, a text string or key stroke entry, a voice command, or other type of input. For purposes of describing the concepts and technologies disclosed herein, the input detected in operation 204 is described herein as including a touch or multi-touch input detected on a touch- or multi-touch-sensitive display, pad, or other input device. It should be understood that this embodiment is illustrative, and should not be construed as being limiting in any way.

From operation 204, the method 200 proceeds to operation 206, wherein the user device 102 determines if the input detected in operation 204 corresponds to an interaction with an option that has a numeric value. As explained above, the dial-based UIs 114 can present various options and/or UI controls for accessing functionality including, but not limited to, options having a numeric value, options having a Boolean value, options for navigating to other menus or options, combinations thereof, and the like. As such, operation 206 can include determining a location of the input detected in operation 204 and determining if the location of the detected input corresponds to a UI control for adjusting a numeric value. Various types of options and controls, as well as navigation using the dial-based UIs 114, are illustrated and described below with reference to FIGS. 3A-3M.

If the user device 102 determines, in operation 206, that the input detected in operation 204 corresponds to an interaction with an option that does not have a numeric value, the method 200 proceeds to operation 208. In operation 208, the user device 102 implements the input detected in operation 204. In some embodiments, the input detected in operation 204 corresponds to selection of a category or root menu; selection of a navigation option; selection of a Boolean option such as, for example, a true/false option, a yes/no option, a zero/one option, an enabled/not-enabled option, or another Boolean option; or the like. As such, the functionality of operation 208 can include implementing the input by navigating to a particular menu, address, category, or the like; by setting an option as yes, no, true, false, zero, one, or the like; or taking another action associated with the selected option.

If the user device 102 determines, in operation 206, that the input detected in operation 204 corresponds to an interaction with an option having a numeric value, the method 200 proceeds to operation 210. In operation 210, the user device 102 can modify the dial-based UI 114 to present a numeric adjustment control. From operation 210, the method 200 proceeds to operation 212. It should be noted that in some embodiments the user device 102 does not modify the dial-based UI 114. As such, the method 200 can proceed directly to operation 212 from operation 206, if desired.

In operation 212, the user device 102 analyzes the input detected in operation 204. The user device 102 analyzes the input to determine a command associated with the input. In some embodiments, where the input includes one or more touch commands, the user device 102 identifies one or more contact points associated with the input and movement of the contact point(s), if any. Additionally, or alternatively, the user device 102 determines a rotation axis of the one or more contact points and a radius associated with the rotation.

As explained above and as is illustrated and described in more detail with reference to FIGS. 3A-3M, the rotation axis and radius can be determined in a number of ways. In some embodiments, the user device 102 sets a rotation axis for a moved contact point as the center of the dial-based UI 114. In other embodiments, the user device 102 analyzes multiple contact points and determines the rotation axis and radius based upon the multiple contact points. If one contact point is stationary and another contact point is moved, the user device 102 can assign the stationary contact point as a rotation axis and the distance between the contact points as the radius. In other embodiments, the user device 102 determines a rotation axis based upon a disbursement of contact points and determining an intersection point between the multiple contact points. The user device 102 can assign a radius corresponding to an average distance between the determined rotation axis and the tracked contact points. Additional and/or alternative methodologies for determining the rotation axis and/or radius are contemplated. As such, it should be understood that these embodiments are illustrative, and should not be construed as being limiting in any way.

From operation 212, the method 200 proceeds to operation 214, wherein the user device 102 determines a command associated with the detected and analyzed input. The user device 102 can determine, for example, that a detected rotation around a determined rotation axis corresponds to a command for increasing or decreasing a numeric value. Similarly, the user device 102 can determine that the input detected and analyzed input corresponds to a command to enter a precision rotation or adjustment mode. Additional commands and gestures are illustrated and described in more detail herein with reference to FIGS. 1 and 3A-3M. The user device 102 can be configured to recognize these and other commands.

From operation 214, the method 200 proceeds to operation 216, wherein the user device 102 implements the command determined in operation 216 and updates the dial-based UI 114. As will be more clearly understood with reference to FIGS. 3A-3M, the dial-based UIs 114 can be updated to indicate that an option is selected, that an option has been selected, a value associated with an option, to display or hide numeric value adjustment controls, to show or hide various indicators such as anchor point, pivot point, and/or contact point indicators, and/or to show or hide other information. Thus, operation 216 can include updating a screen display associated with the user device 102 to show how input from the user has been or is being implemented by the dial-based UI 114. Although not shown or described with reference to operation 208, it should be understood that the user device 102 can update a screen display in operation 208 as well.

From operation 216, the method 200 proceeds to operation 218. At operation 218, the user device 102 determines if the input has changed. According to various embodiments, the input can be determined to have changed if a rate of movement has changed, if a rotation axis associated with the movements has moved, if the radius of the contact points has moved, if the number of contact points has changed, if a direction of movement has changed, or if other changes are detected. If the user device 102 determines, in operation 218, that the input has changed, the method 200 returns to operation 210, wherein the user device 102 determines if the modified input corresponds to a multi-touch input or not.

The operations 210-218 can be iterated until the user device 102 determines, in any iteration of operation 218, that the input has not changed.

If the user device 102 determines that the input has not changed, the method 200 proceeds to operation 220. At operation 220, the user device 102 determines if the input has ceased and/or if the command has been completed. The user device 102 can determine, for example, that the contact has ceased, that movement has ceased, or the like. If the user device 102 determines that the input has not ceased, the method 200 returns to operation 218.

If the user device 102 determines, in any iteration of operation 220, that the input has cased, the method 200 proceeds to operation 222. Similarly, the method 200 proceeds to operation 222 from operation 208. The method 200 ends at operation 222.

Turning now to FIGS. 3A-3M, UI diagrams showing various aspects of the concepts and technologies disclosed herein for interacting with dial-based user interfaces will be described according to various illustrative embodiments. In particular, FIG. 3A shows a dial-based menu interface 300A generated by the user device 102. In some embodiments, the dial based menu interface 300A corresponds to the dial-based UI 114 shown in FIG. 1. It should be appreciated that the UI diagram illustrated in FIG. 3A is illustrative of one contemplated embodiment, and therefore should not be construed as being limited in any way.

As shown in FIG. 3A, the dial-based menu interface 300A includes a number of soft-button UI controls 302A-G (hereinafter collectively and/or collectively referred to as "soft buttons 302"). In the illustrated embodiment, the soft buttons 302A-F are radially arranged around a menu root soft button 302G. In other embodiments, the area within the dial-based menu interface 300A is divided into the soft buttons 302. While the soft buttons 302A-F are illustrated as being substantially equal in size, it should be understood that this not necessarily the case. In particular, the soft buttons 302 can be irregularly shaped, of unequal size, and/or arranged in any desired arrangement. As such, the soft buttons 302 shown in FIG. 3A are illustrative of one contemplated embodiment, and should not be construed as being limiting in any way.

The soft buttons 302 can be selected by a user to cause the user device 102 to take various actions. For example, selection of the soft button 302A can cause the user device 102 to modify the dial-based menu interface 300A to display a first category of options. Selection of the soft button 302F can cause the user device 102 to cease display of the dial-based menu interface 300A, though this is not necessarily the case. Similarly, selection of the soft button 302G can cause the user device 102 to modify the dial-based menu interface 300A to display a root menu. It should be understood that these embodiments are illustrative, and should not be construed as being limiting in any way.

The dial-based menu interface 300A also includes a number of indicator areas or regions ("indicators") 304A-G (hereinafter generically and/or collectively referred to as "indicators 304"). The indicators 304 can be controlled by the user device 102 and/or an application program 108 executed thereon or interacted with by the user device 102 to present various types of information to a user. For example, in some embodiments the indicators 304 are highlighted, shaded, or otherwise visually modified to communicate to a user that the soft buttons 302 have been selected in the past, to communicate history information to a user, to indicate that the soft buttons 302 are currently selected, to indicate values of one or more options associated with the soft buttons 302, and/or for other purposes. These and other aspects of the dial-based menu interface 300A are described in more detail below with reference to FIGS. 3B-3F.

Figure 3B:
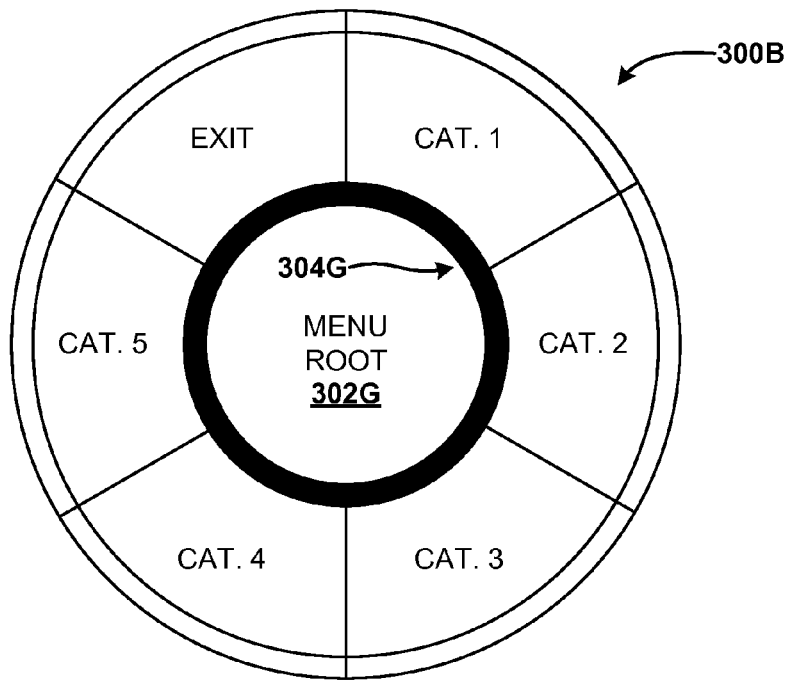

Referring now to FIG. 3B, a UI diagram showing additional aspects of the concepts and technologies disclosed herein for interacting with dial-based user interfaces is described in detail. In particular, FIG. 3B shows a dial-based menu interface 300B generated by the user device 102. The dial-based menu interface 300B shown in FIG. 3B can be substantially similar to the dial-based menu interface 300A shown in FIG. 3A. The dial-based menu interface 300B also includes a focus feature. The focus feature can be used to indicate to a user that the menu option corresponding to the soft button 302G currently has focus. As used herein, a menu option and/or soft button 302G having "focus" corresponds to a menu option or soft button that is currently interacted with by a system presenting the dial-based user interface 300B such as, for example, the user device 102. In the illustrated embodiment, the indicator 304G around the soft button 302G is shown as being highlighted to indicate that the focus of the user device 102 is currently on the soft button 302G, corresponding to a menu root menu option. Because other methods of indicating focus are contemplated, it should be understood that the highlighting shown herein is illustrative, and should not be construed as being limiting in any way.

Figure 3C:
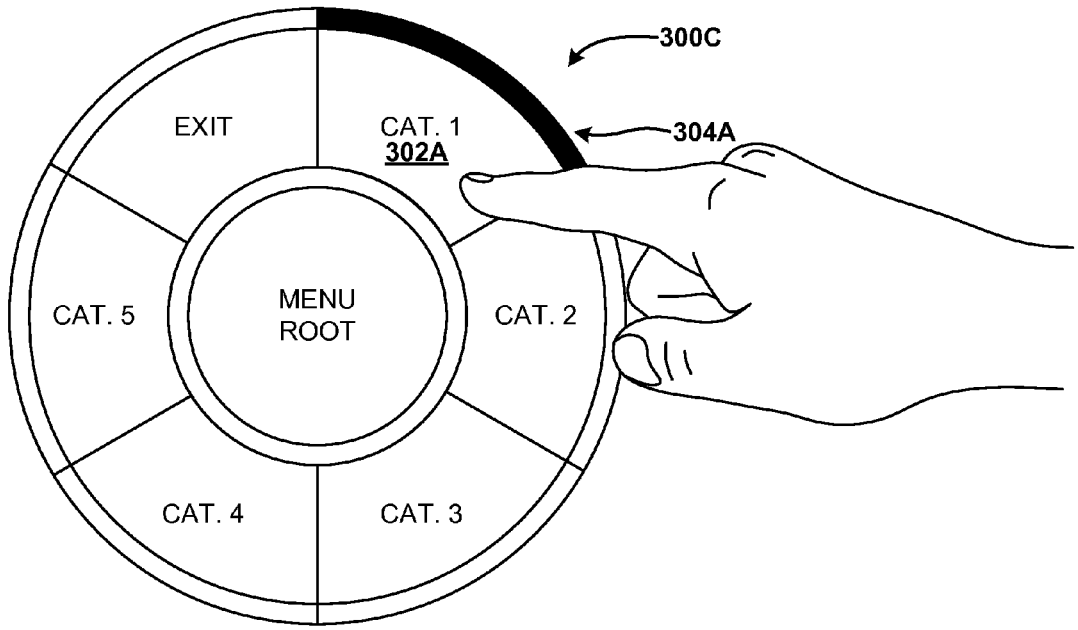

Turning now to FIG. 3C, a UI diagram showing additional aspects of the concepts and technologies disclosed herein for interacting with dial-based user interfaces is described in detail. In particular, FIG. 3C shows a dial-based menu interface 300C generated by the user device 102. As shown in FIG. 3C, the indicators 304 also can be used to indicate selections and history information to users. In the embodiment illustrated in FIG. 3C, the indicator 304A is highlighted, indicating that the soft button 302A is being pressed or otherwise selected by a user to navigate to a category entitled "Category 1." It should be understood that this embodiment is illustrative, and should not be construed as being limiting in any way.

According to various implementations of the concepts and technologies disclosed herein, the various menu options corresponding to the soft buttons 302 can be divided into one of several types including, but not limited to, numerical options, Boolean options, navigation options, other options, and the like. As used herein, a numerical option corresponds to a command or action for adjusting, entering, or changing a numeric value. For example, a "brightness" level of a display can be adjusted via adjustment of a numeric value, for example, from a brightness of zero to a brightness of one hundred. It should be understood that this embodiment is illustrative, and should not be construed as being limiting in any way. A "Boolean" option can include any type of yes/no, true/false, zero/one, enabled/not-enabled, or other Boolean options or values. A navigation option can include an option to navigate to another menu, category, sub-category, or the like. Other types of options are contemplated and are possible. According to various embodiments of the concepts and technologies disclosed herein, the dial-based menu interfaces presented herein can enable functionality for adjusting numeric values.

Figure 3D:
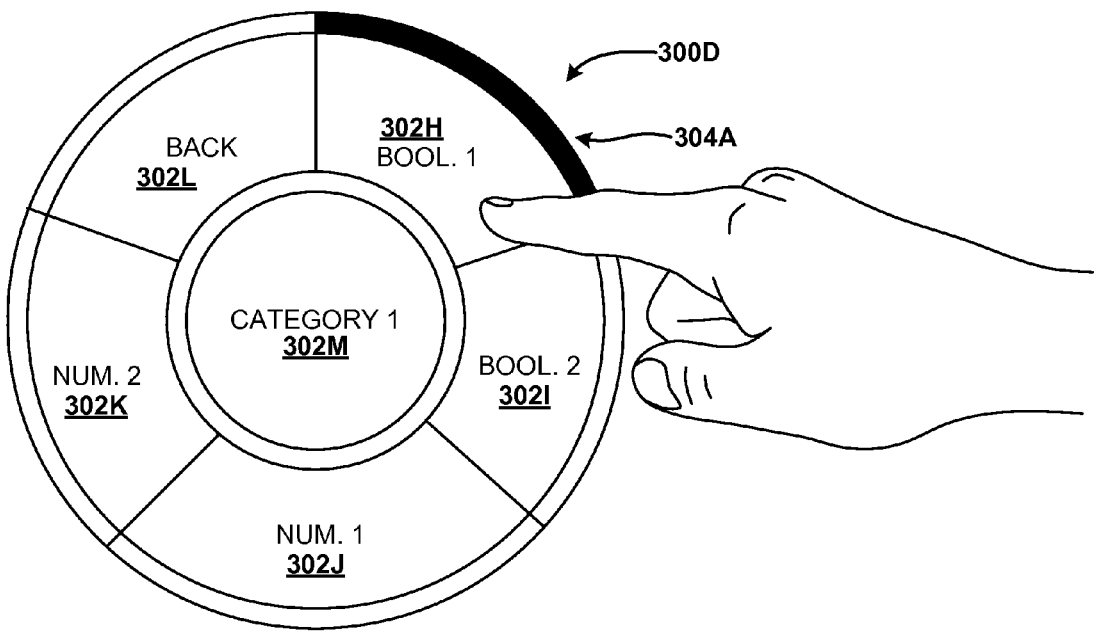

Turning now to FIG. 3D, a UI diagram showing additional aspects of the concepts and technologies disclosed herein for interacting with dial-based user interfaces is described in detail. In particular, FIG. 3D shows a dial-based menu interface 300D generated by the user device 102 for accessing functionality for adjusting a numeric value. In some embodiments, the dial-based menu interface 300D can be generated in response to selection of the soft button 302A to access the category of menu options entitled "Category 1" as shown in FIG. 3C, though this is not necessarily the case. As shown in FIG. 3D, the dial-based menu interface 300D can display soft buttons 304H-M (hereinafter collectively and/or generically referred to as "indicators 304"). As shown in FIG. 3D, the menu root soft button 302G shown in FIGS. 3A-3C is replaced, in FIG. 3D, with a "Category 1" indicator to indicate to a user that he or she has navigated to the category of menu options entitled "Category 1." It should be understood that this embodiment is illustrative, and should not be construed as being limiting in any way.

Figure 3E:
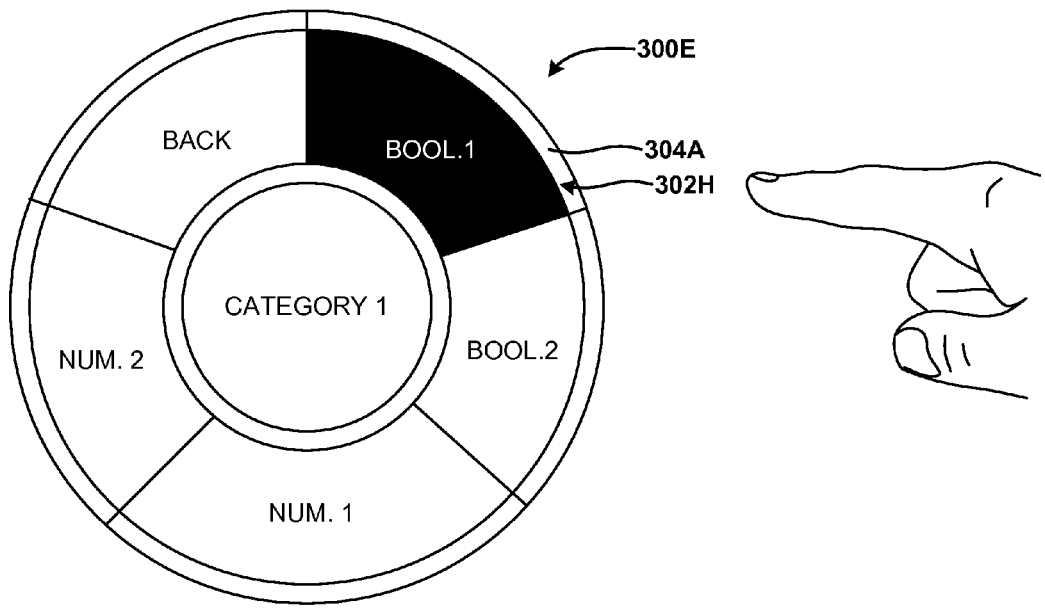
Figure 3F:
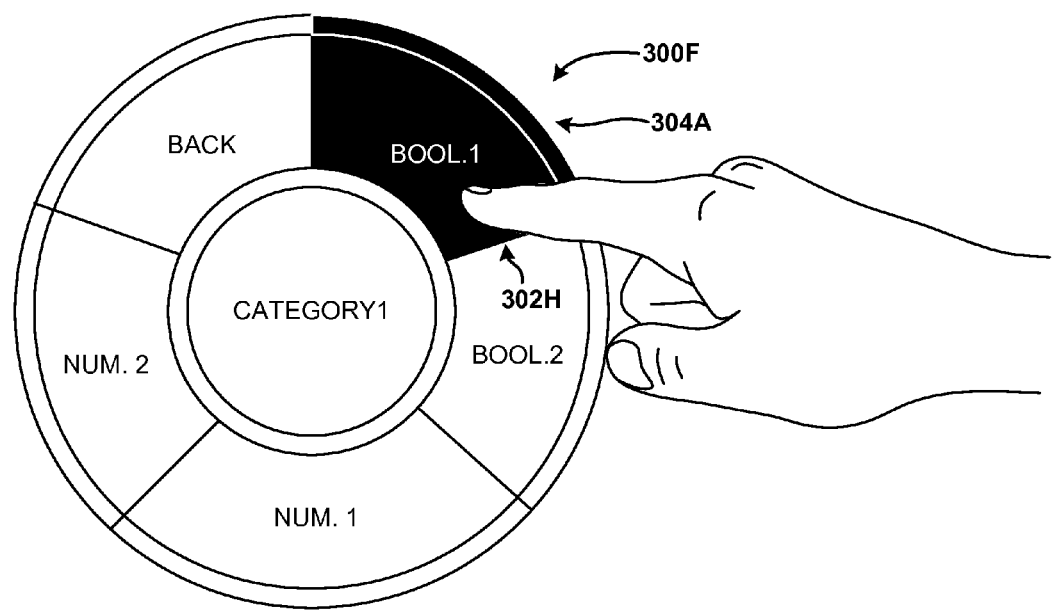

To illustrate additional aspects of the concepts and technologies disclosed herein, the soft button 302H is illustrated as being selected by a user. In the illustrated embodiment, the indicator 304A is shown as highlighted, indicating that the soft button 302H is selected. According to some implementations, the soft buttons 302 also can be highlighted or not highlighted to indicate that the option corresponding to the soft button 302 is selected or not selected, as illustrated in FIGS. 3E-F. As shown in FIGS. 3E-F, the soft button 302H is shown as highlighted. According to various implementations, the soft button 302H is shown as highlighted to indicate to a user that the menu option corresponding to the soft button 302H is selected or enabled, regardless of whether or not the soft button 302H is currently being selected by a user.

As shown in FIG. 3F, the indicator 304A is illustrated as highlighted. In some embodiments, the indicator 304A indicates selection of the soft button 302H, though this is not necessarily the case. In the illustrated embodiment, the highlighting of the indicator 304A indicates selection of the soft button 302H. Thus, the embodiments illustrated in FIGS. 3D-3F can communicate to a user, respectively, the following: selection of the soft button 302H, wherein the option corresponding to the soft button 302H is not selected in the case of the FIG. 3D; no selection of the soft button 302H, wherein the option corresponding to the soft button 302H is selected in the case of the FIG. 3E; and selection of the soft button 302H, wherein the option corresponding to the soft button 302H is selected in the case of the FIG. 3F. Because the various highlighting options disclosed herein are optional and/or can be varied, it should be understood that these embodiments are illustrative, and should not be construed as being limiting in any way.

Figure 3G:
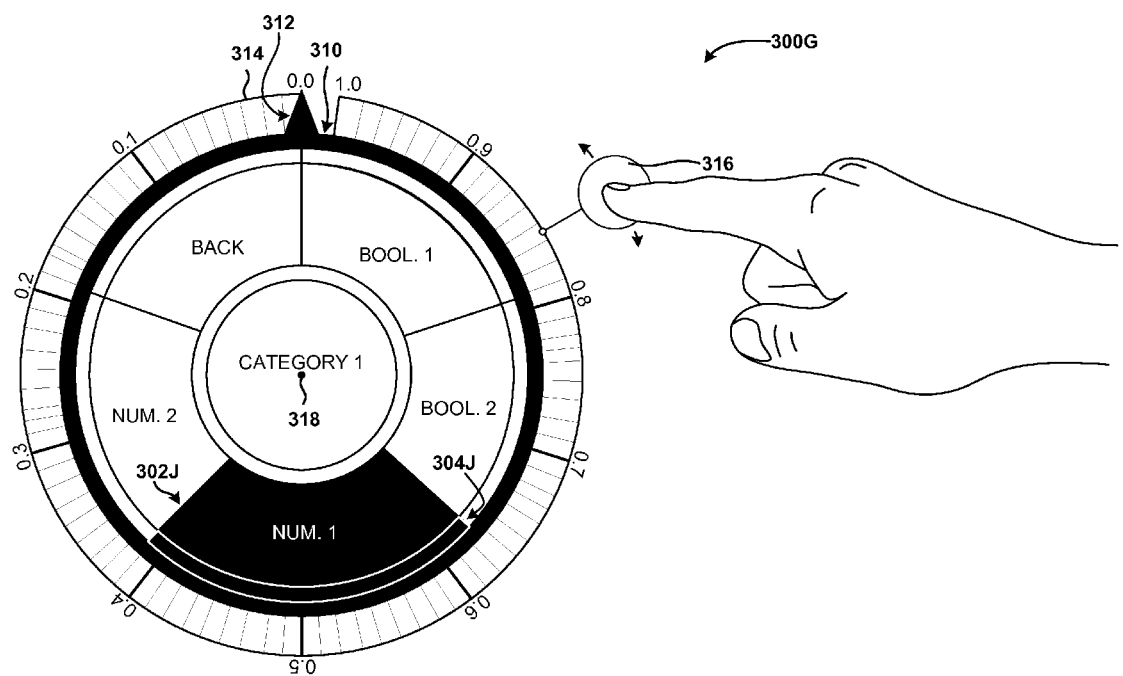

Turning now to FIG. 3G, a UI diagram showing additional aspects of the concepts and technologies disclosed herein for interacting with dial-based user interfaces is described in detail. In particular, FIG. 3G shows a dial-based menu interface 300G generated by the user device 102 for adjusting a numeric value. In the illustrated embodiment, the dial-based menu interface 300G is generated by the user device 102 in response to selection of the soft button 302J to adjust a value for a value associated with the "Numeric value 1," though this is not necessarily the case. In the illustrated embodiment, the soft button 302J has been selected and released to enter a numeric value adjustment mode. It should be understood that this embodiment is illustrative, and should not be construed as being limiting in any way.

As shown in FIG. 3G, the dial-based menu interface 300G can be configured to display an adjustment ring 310. The adjustment ring 310 can include a point or needle 312 for indicating a measurement point associated with the numeric value being set or adjusted via the dial-based menu interface 300G. In accordance with the concepts and technologies disclosed herein, a user can adjust a numeric value via the dial-based menu interface 300G by entering various types of input corresponding to one or more commands. In some embodiments, for example, a user enters a numerical string or keystroke command corresponding to a set value, issues a voice command, and/or interacts with the dial-based user interface 300G using an input device such as a mouse, one or more fingers touch- or multi-touch display or other device, a combination thereof, or the like.

In some embodiments, a user can tap, for example, on the needle 312 and drag the needle 312 until the needle 312 points at a desired value on a scale 314 that is arranged radially around the dial-based menu interface 300G. In other embodiments, a user taps or otherwise contacts a touch- or multi-touch display at a point 316 with a finger and moves the finger to rotate the scale 314 until a desired value is indicated or pointed at by the needle 312. Additional details of rotating the scale 314 are described below. According to some embodiments, a user can slide the finger about a rotation axis to rotate the scale 314 a corresponding amount about a rotation axis of the scale 314. In the illustrated embodiment, the rotation axis of the finger corresponds to an axis projecting in a z-axis through a center 318 of the soft button 302M, though this is not necessarily the case.

According to some implementations of the concepts and technologies disclosed herein, a user slides his or her finger toward or away from the rotation axis to adjust a rate of rotation of the scale 314 associated with movement of the user's finger or other appendage. As shown in FIG. 3H, a user can slide his or her finger from the location 316 to a second location 316' to enter into a fine adjustment mode. In the fine adjustment mode, a movement of the user's finger or other appendage rotates the scale 314 as if the radius of the scale 314 was extended out to the second location 316'. As such, it can be appreciated that a movement of one linear inch, for example, in the embodiment shown in FIG. 3G can rotate the scale 314 a greater distance relative to a rotation in response to a movement of the finger one linear inch in the embodiment shown in FIG. 3H. It should be understood that these embodiments are illustrative, and should not be construed as being limiting in any way.

Figure 3I:
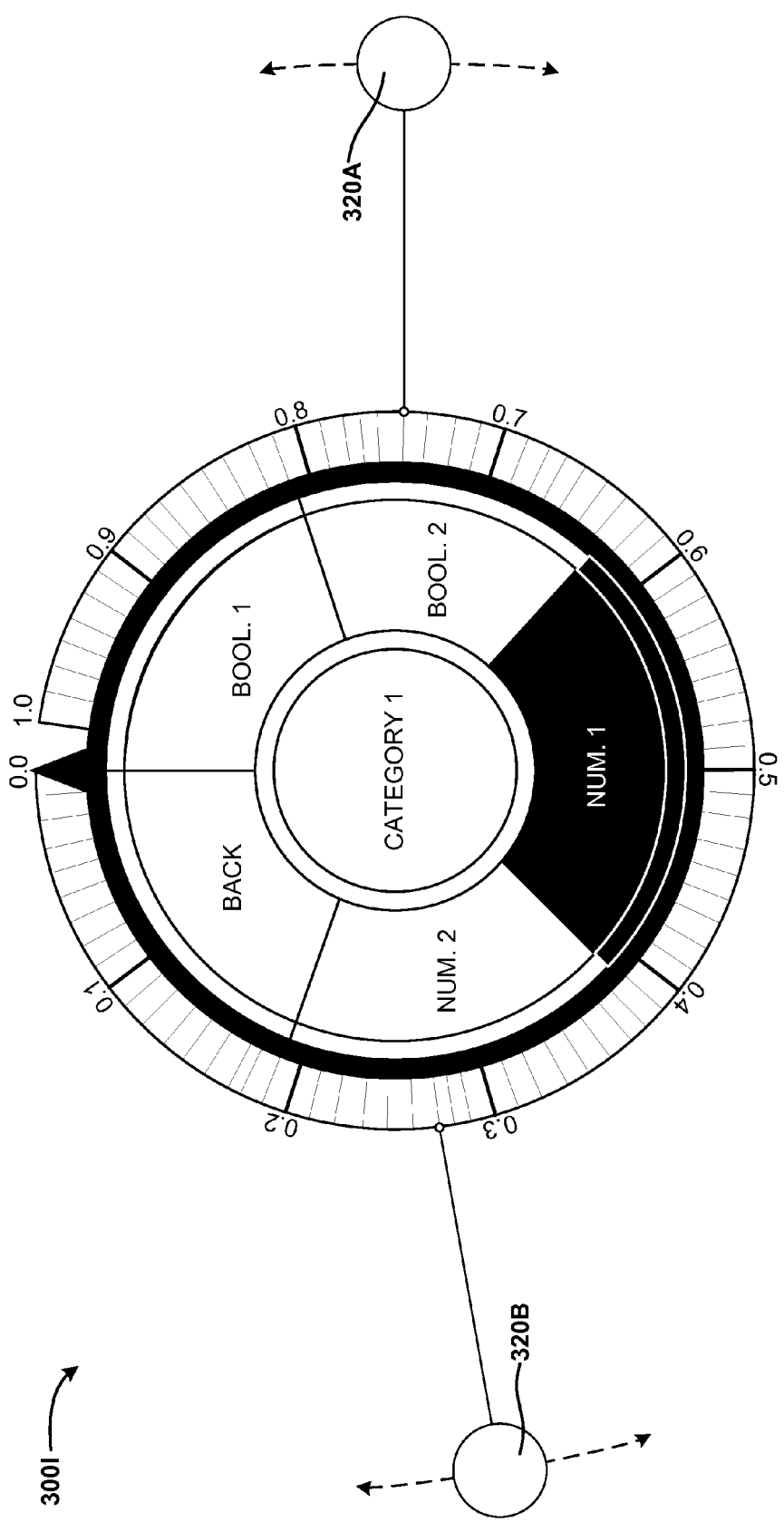

Turning now to FIG. 3I, a UI diagram showing additional aspects of the concepts and technologies disclosed herein for interacting with dial-based user interfaces is described in detail. In particular, FIG. 3I shows a dial-based menu interface 300I generated by the user device 102 for adjusting a numeric value. As shown in FIG. 3I, some embodiments of the dial-based UIs 114 allow a user to adjust a numeric value using two or more fingers. In the illustrated embodiment, a user is contacting a touch surface with two fingers simultaneously at locations 320A, 320B. It can be appreciated that a user may use two fingers to adjust a numeric value with added precision, relative to a using a single finger or other input mechanism such as a mouse pointer, though this is not necessarily the case. For example, some users may experience additional control during adjusting the numeric value if using two fingers, relative to an amount of control experienced using a single finger. Furthermore, it can be appreciated that using two or more contact points can enhance the realism of interacting with the dial-based menu interface 300I relative to other menu interfaces and/or can reduce errors causes by unintended contacts with the input device. It should be understood that this embodiment is illustrative, and should not be construed as being limiting in any way.

Figure 3J:
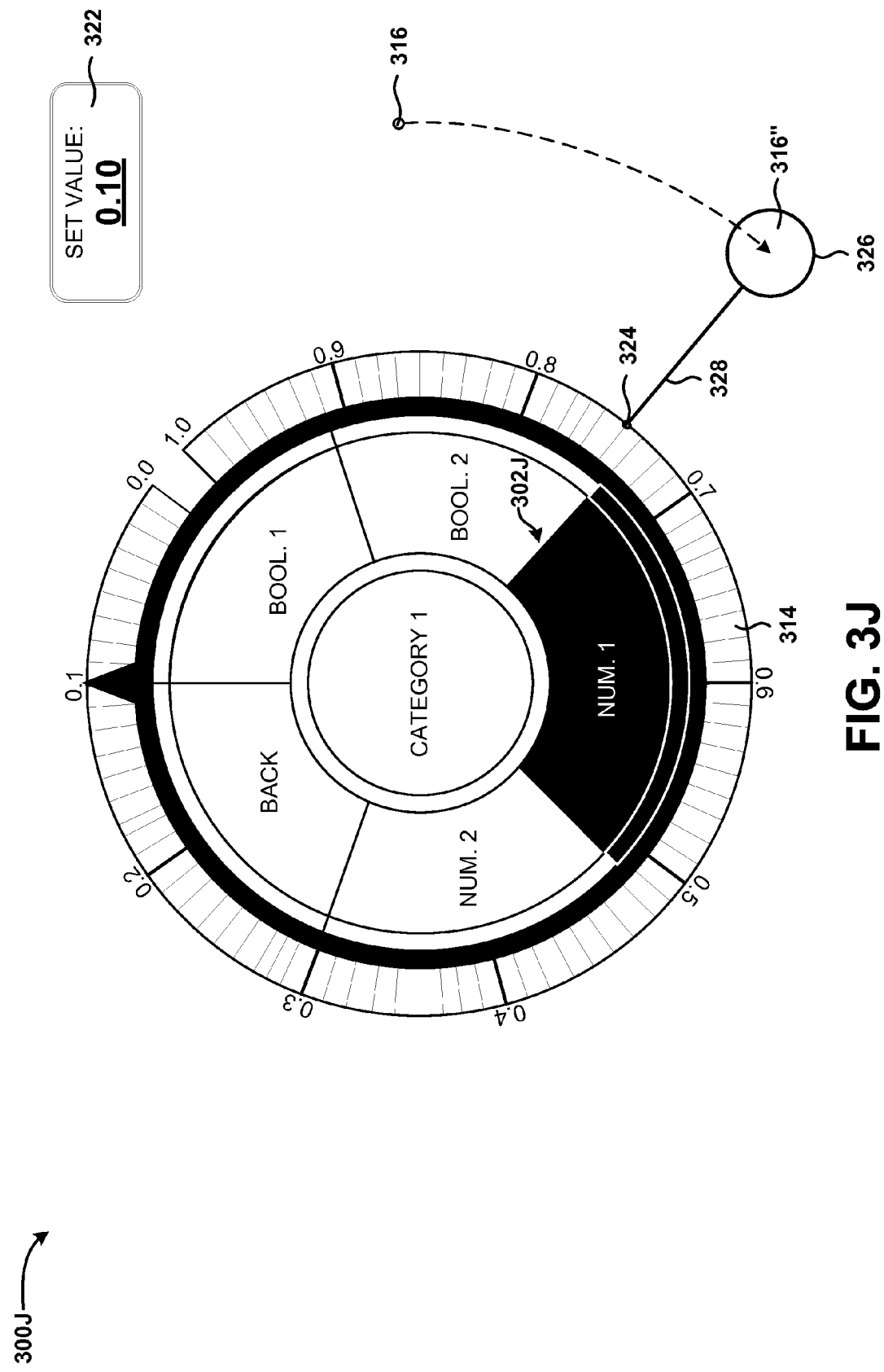

Turning now to FIG. 3J, a UI diagram showing additional aspects of the concepts and technologies disclosed herein for adjusting values via dial-based user interfaces is described in detail. In particular, FIG. 3J shows a dial-based menu interface 300J generated by the user device 102 for adjusting a numeric value, according to another embodiment. As shown in FIG. 3J, a user can adjust a numeric value associated with the dial-based menu interface 300J by sliding his or her finger from a first position 316 to another position 316", thereby rotating the scale 314 a corresponding amount about the rotation axis 318.

Additionally, the embodiment shown in FIG. 3J includes additional features that can be included in various embodiments of the concepts and technologies disclosed herein. In particular, the illustrated embodiment shows an indicator window 322 for presenting or indicating a current setting associated with the dial-based menu interface 300J. In the illustrated embodiment, the indicator window 322 displays a numeric value associated with the soft button 302J.

The illustrated embodiment also includes an anchor point indicator 324, a selection point indicator 326, and a connection line 328 that connects the anchor point indicator 324 to the selection point 326. The anchor point indicator 324, the selection point indicator 326, and the connection line 328 can be displayed on a screen as part of the dial-based menu interface 300J (or any other dial-based menu interface disclosed herein) to indicate to a user the selection point at which the user contacts a touch-sensitive display and an anchor point indicating a nearest point on the scale 314. If the user slides his or her finger or other appendage away from the rotation axis as described above with regard to FIGS. 3G-3H, the selection point indicator 326 and/or the connection line 328 can be modified to indicate this change. It should be understood that these embodiments are illustrative, and should not be construed as being limiting in any way.

Figure 3K:
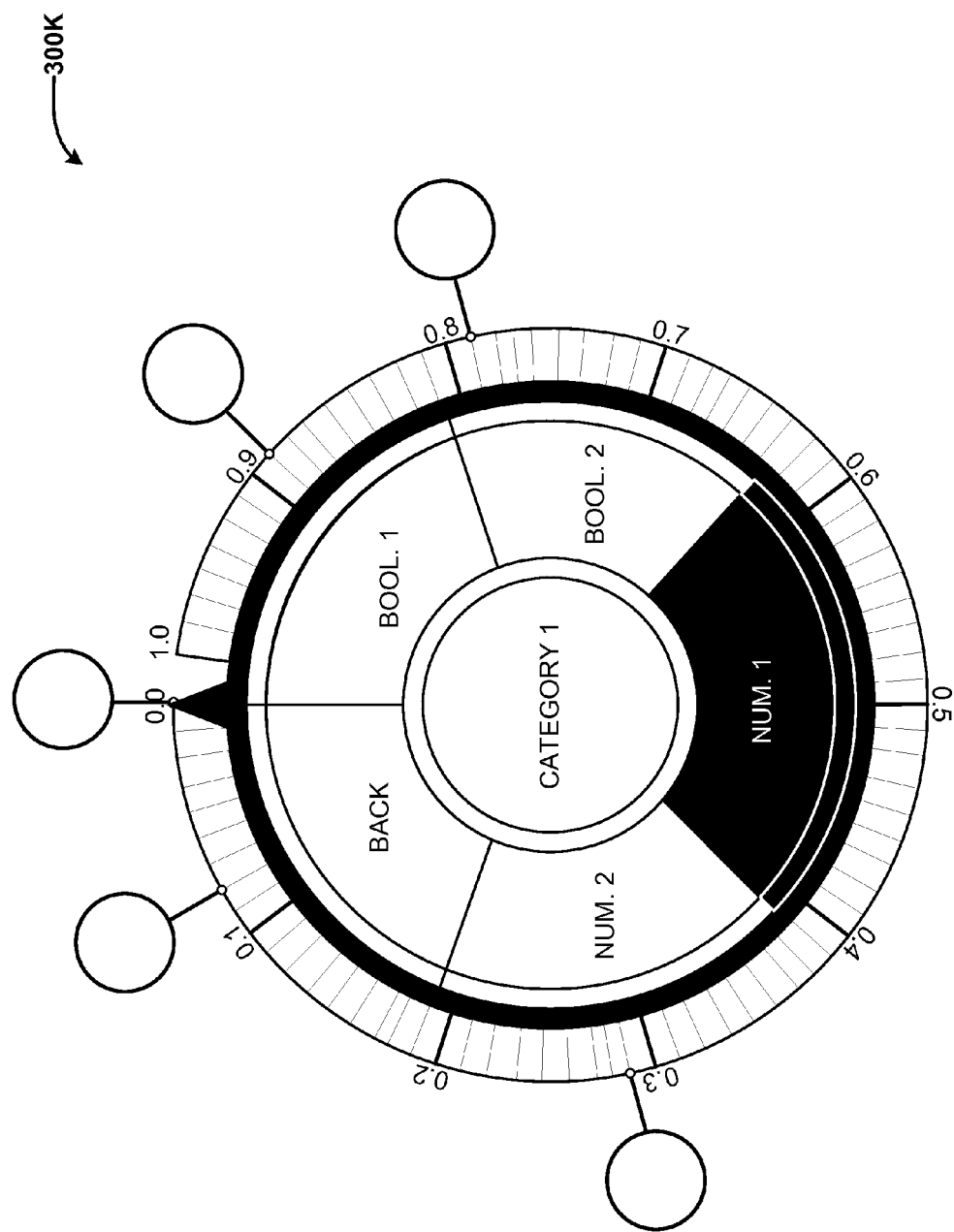
Figure 3L:
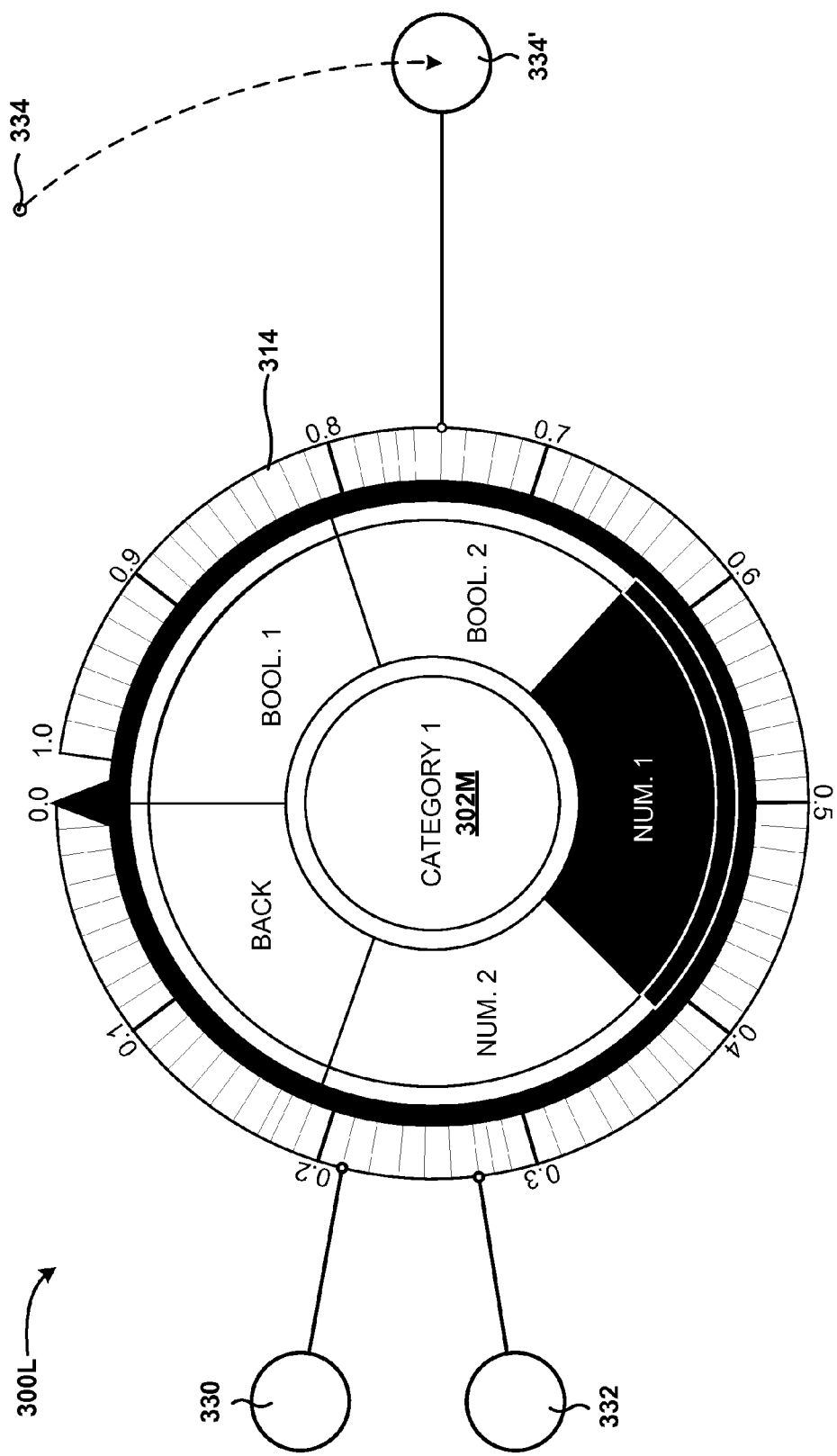

Turning now to FIG. 3K, a UI diagram showing additional aspects of the concepts and technologies disclosed herein for adjusting values via dial-based user interfaces is described in detail. In particular, FIG. 3K shows a dial-based menu interface 300K generated by the user device 102 for adjusting a numeric value, according to another embodiment. As shown in FIG. 3K, a user can adjust a numeric value associated with the dial-based menu interface 300K by contacting a touch-sensitive device such as a multi-touch display with multiple fingers. As explained above, the use of multiple fingers can increase a realism of interactions with the dial-based menu interface 300K relative to other forms of interacting with the dial-based menu interface 300K, can reduce or eliminate false commands prompted by stray contacts with the interface, and/or can provide added precision, relative to using a single input device, finger, or other input mechanism.

Referring to FIG. 3L, a UI diagram showing additional aspects of the concepts and technologies disclosed herein for adjusting values via dial-based user interfaces is described in detail. In particular, FIG. 3L shows a dial-based menu interface 300L generated by the user device 102 for adjusting a numeric value, according to another embodiment. As shown in FIG. 3L, a user can adjust a numeric value associated with the dial-based menu interface 300L by contacting a touch-sensitive device such as a multi-touch display with multiple fingers, wherein one or more of the fingers is held stationary and one or more of the fingers is moved while in contact with the display. In the illustrated embodiment, three fingers are used, one finger is held stationary at the location 330, a second finger is held stationary at the location 332, and a third finger is used to contact the surface and moved from a first location 334 to a second location 334'.

As explained above with reference to FIG. 1, this gesture can be referred to as a pivot and rotate gesture. In the illustrated embodiment, the user device 102 can determine a rotation axis such as, for example, the center of the soft button 302M. The user device 102 also can assign a rotation radius as the average of a first distance between the location 330 and the location 334 and a second distance from the location 332 and the location 334. The user device 102 can be configured to rotate the scale 314 as if the user used a single finger contact at the determined rotation radius of the center of the soft button 302M. As such, the pivot and rotate gesture can be used to provide a high-precision rotation mode with limited display or input device real-estate, for example. It should be understood that this embodiment is illustrative, and should not be construed as being limiting in any way.

Figure 3M:
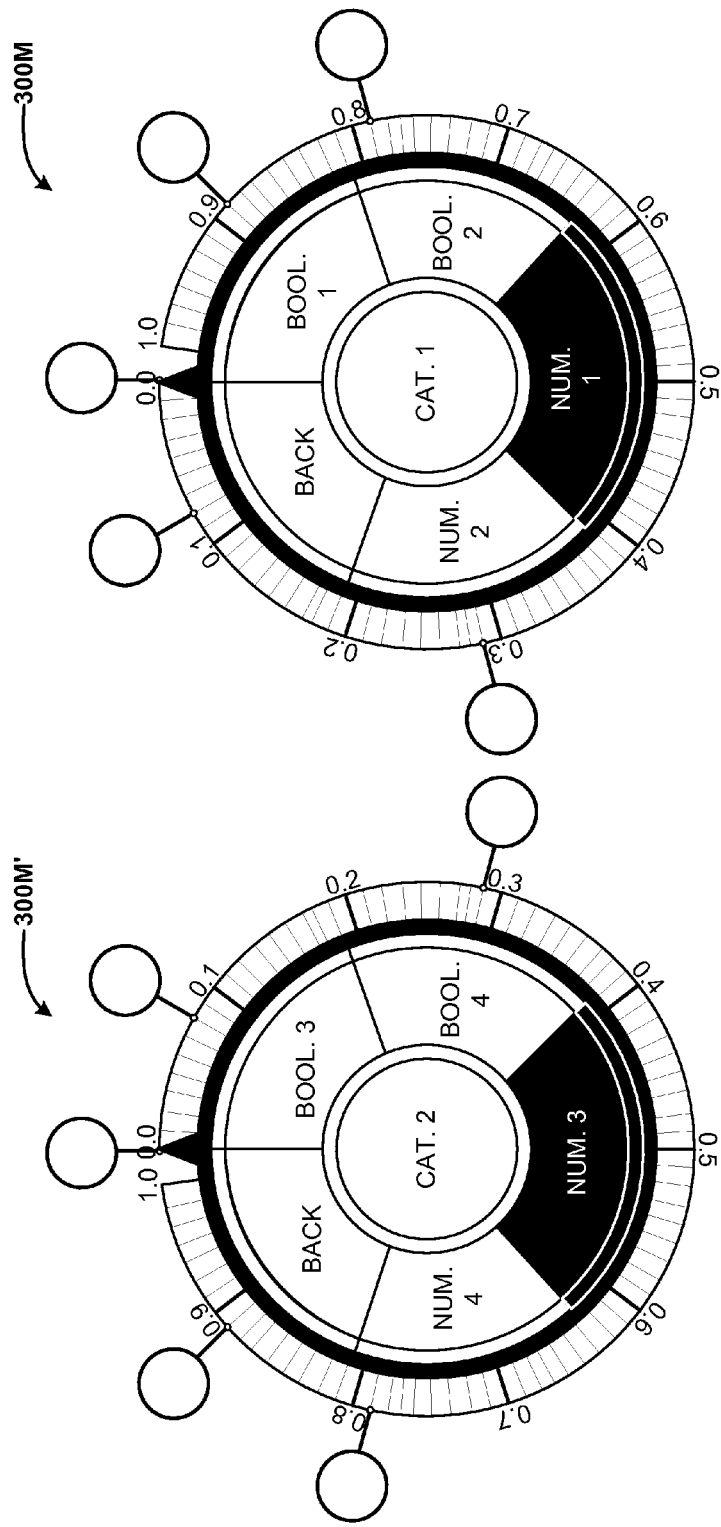

As shown in FIG. 3M, various embodiments of the concepts and technologies disclosed herein support simultaneous adjustment of two or more numeric values. In the illustrated embodiment, two or more dial-based menu interfaces 300M, 300M' can be simultaneously presented and configured for use, respectively, by a right hand and a left hand. Thus, the dial-based menu interfaces 300M, 300M' can be configured for mirror-image type movements, though this is not necessarily the case. It can be appreciated that some embodiments of the concepts and technologies disclosed herein make use of a multi-touch display configured to support a large number of simultaneous contact inputs. In one embodiment, a multi-touch display that supports up to fifty-three contacts is used. Other numbers of contacts are possible and are contemplated.

FIG. 4 illustrates an illustrative computer architecture 400 for a device capable of executing the software components described herein for supporting interactions with dial-based user interfaces. Thus, the computer architecture 400 illustrated in FIG. 4 illustrates an architecture for a server computer, mobile phone, a PDA, a smart phone, a desktop computer, a netbook computer, a tablet computer, and/or a laptop computer. The computer architecture 400 may be utilized to execute any aspects of the software components presented herein.

The computer architecture 400 illustrated in FIG. 4 includes a central processing unit 402 ("CPU"), a system memory 404, including a random access memory 406 ("RAM") and a read-only memory ("ROM") 408, and a system bus 410 that couples the memory 404 to the CPU 402. A basic input/output system containing the basic routines that help to transfer information between elements within the computer architecture 400, such as during startup, is stored in the ROM 408. The computer architecture 400 further includes a mass storage device 412 for storing the operating system 106 and the application programs 108. The mass storage device 412 also can be configured to store the data 110 and the dial-based UI 114, if desired.

The mass storage device 412 is connected to the CPU 402 through a mass storage controller (not shown) connected to the bus 410. The mass storage device 412 and its associated computer-readable media provide non-volatile storage for the computer architecture 400. Although the description of computer-readable media contained herein refers to a mass storage device, such as a hard disk or CD-ROM drive, it should be appreciated by those skilled in the art that computer-readable media can be any available computer storage media or communication media that can be accessed by the computer architecture 400.

Communication media includes computer readable instructions, data structures, program modules, or other data in a modulated data signal such as a carrier wave or other transport mechanism and includes any delivery media. The term "modulated data signal" means a signal that has one or more of its characteristics changed or set in a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

By way of example, and not limitation, computer storage media may include volatile and non-volatile, removable and non-removable media implemented in any method or technology for storage of information such as computer-readable instructions, data structures, program modules or other data. For example, computer media includes, but is not limited to, RAM, ROM, EPROM, EEPROM, flash memory or other solid state memory technology, CD-ROM, digital versatile disks ("DVD"), HD-DVD, BLU-RAY, or other optical storage, magnetic cassettes, magnetic tape, magnetic disk storage or other magnetic storage devices, or any other medium which can be used to store the desired information and which can be accessed by the computer architecture 400. For purposes the claims, the phrase "computer storage medium" and variations thereof, does not include waves, signals, and/or other transitory and/or intangible communication media, per se.

According to various embodiments, the computer architecture 400 may operate in a networked environment using logical connections to remote computers through a network such as the network 104. The computer architecture 400 may connect to the network 104 through a network interface unit 414 connected to the bus 410. It should be appreciated that the network interface unit 414 also may be utilized to connect to other types of networks and remote computer systems, for example, the data source 112. The computer architecture 400 also may include an input/output controller 416 for receiving and processing input from a number of other devices, including a keyboard, mouse, or electronic stylus (not shown in FIG. 4). Similarly, the input/output controller 416 may provide output to a display screen, a printer, or other type of output device (also not shown in FIG. 4).

It should be appreciated that the software components described herein may, when loaded into the CPU 402 and executed, transform the CPU 402 and the overall computer architecture 400 from a general-purpose computing system into a special-purpose computing system customized to facilitate the functionality presented herein. The CPU 402 may be constructed from any number of transistors or other discrete circuit elements, which may individually or collectively assume any number of states. More specifically, the CPU 402 may operate as a finite-state machine, in response to executable instructions contained within the software modules disclosed herein. These computer-executable instructions may transform the CPU 402 by specifying how the CPU 402 transitions between states, thereby transforming the transistors or other discrete hardware elements constituting the CPU 402.

Encoding the software modules presented herein also may transform the physical structure of the computer-readable media presented herein. The specific transformation of physical structure may depend on various factors, in different implementations of this description. Examples of such factors may include, but are not limited to, the technology used to implement the computer-readable media, whether the computer-readable media is characterized as primary or secondary storage, and the like. For example, if the computer-readable media is implemented as semiconductor-based memory, the software disclosed herein may be encoded on the computer-readable media by transforming the physical state of the semiconductor memory. For example, the software may transform the state of transistors, capacitors, or other discrete circuit elements constituting the semiconductor memory. The software also may transform the physical state of such components in order to store data thereupon.

As another example, the computer-readable media disclosed herein may be implemented using magnetic or optical technology. In such implementations, the software presented herein may transform the physical state of magnetic or optical media, when the software is encoded therein. These transformations may include altering the magnetic characteristics of particular locations within given magnetic media. These transformations also may include altering the physical features or characteristics of particular locations within given optical media, to change the optical characteristics of those locations. Other transformations of physical media are possible without departing from the scope and spirit of the present description, with the foregoing examples provided only to facilitate this discussion.

In light of the above, it should be appreciated that many types of physical transformations take place in the computer architecture 400 in order to store and execute the software components presented herein. It also should be appreciated that the computer architecture 400 may include other types of computing devices, including hand-held computers, embedded computer systems, personal digital assistants, and other types of computing devices known to those skilled in the art. It is also contemplated that the computer architecture 400 may not include all of the components shown in FIG. 4, may include other components that are not explicitly shown in FIG. 4, or may utilize an architecture completely different than that shown in FIG. 4.

Figure 5:
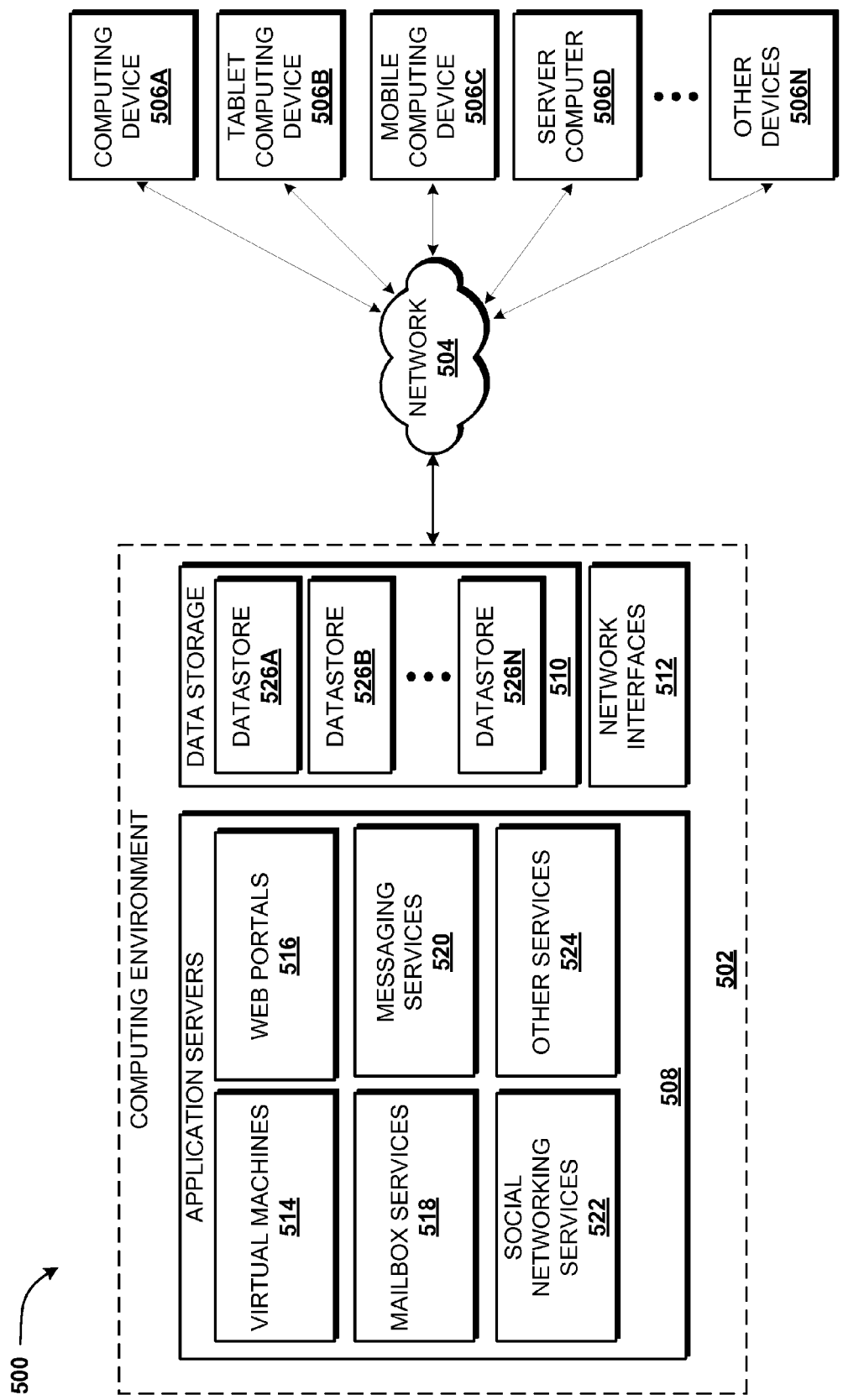
FIG. 5 is a diagram illustrating a distributed computing environment capable of implementing aspects of the embodiments presented herein.

FIG. 5 illustrates an illustrative distributed computing environment 500 capable of executing the software components described herein for supporting interactions with dial-based user interfaces. Thus, the distributed computing environment 500 illustrated in FIG. 5 can be used to provide the functionality described herein with respect to the user device 102 and/or other devices capable of providing the dial-based UIs 114. The distributed computing environment 500 thus may be utilized to execute any aspects of the software components presented herein.

According to various implementations, the distributed computing environment 500 includes a computing environment 502 operating on, in communication with, or as part of the network 504. The network 504 also can include various access networks. According to various implementations, the functionality of the network 504 is provided by the network 104 illustrated in FIGS. 1 and 4. One or more client devices 506A-506N (hereinafter referred to collectively and/or generically as "clients 506") can communicate with the computing environment 502 via the network 504 and/or other connections (not illustrated in FIG. 5). In the illustrated embodiment, the clients 506 include a computing device 506A such as a laptop computer, a desktop computer, or other computing device; a slate or tablet computing device ("tablet computing device") 506B; a mobile computing device 506C such as a mobile telephone, a smart phone, or other mobile computing device; a server computer 506D; and/or other devices 506N. It should be understood that any number of clients 506 can communicate with the computing environment 502. Two example computing architectures for the clients 506 are illustrated and described herein with reference to FIGS. 4 and 6. It should be understood that the illustrated clients 506 and computing architectures illustrated and described herein are illustrative, and should not be construed as being limited in any way.

In the illustrated embodiment, the computing environment 502 includes application servers 508, data storage 510, and one or more network interfaces 512. According to various implementations, the functionality of the application servers 508 can be provided by one or more server computers that are executing as part of, or in communication with, the network 504. The application servers 508 can host various services, virtual machines, portals, and/or other resources. In the illustrated embodiment, the application servers 508 host one or more virtual machines 514 for hosting applications or other functionality. According to various implementations, the virtual machines 514 host one or more applications and/or software modules for providing the functionality described herein for supporting interactions with dial-based user interfaces. It should be understood that this embodiment is illustrative, and should not be construed as being limiting in any way. The application servers 508 also host or provide access to one or more Web portals, link pages, Web sites, and/or other information ("Web portals") 516.

According to various implementations, the application servers 508 also include one or more mailbox services 518 and one or more messaging services 520. The mailbox services 518 can include electronic mail ("email") services. The mailbox services 518 also can include various personal information management ("PIM") services including, but not limited to, calendar services, contact management services, collaboration services, and/or other services. The messaging services 520 can include, but are not limited to, instant messaging services, chat services, forum services, and/or other communication services.

As shown in FIG. 5, the application servers 508 also can host other services, applications, portals, and/or other resources ("other resources") 524. It thus can be appreciated that the computing environment 502 can provide integration of the concepts and technologies disclosed herein provided herein for supporting interactions with dial-based user interfaces with various mailbox, messaging, social networking, and/or other services or resources. For example, the concepts and technologies disclosed herein can provide dial-based user interfaces for interacting with social networking services, mail services, messaging services, and/or other services or applications.

As mentioned above, the computing environment 502 can include the data storage 510. According to various implementations, the functionality of the data storage 510 is provided by one or more databases operating on, or in communication with, the network 504. The functionality of the data storage 510 also can be provided by one or more server computers configured to host data for the computing environment 502. The data storage 510 can include, host, or provide one or more real or virtual datastores 526A-526N (hereinafter referred to collectively and/or generically as "datastores 526"). The datastores 526 are configured to host data used or created by the application servers 508 and/or other data. Although not illustrated in FIG. 5, the datastores 526 also can host or store the data 110 shown in FIGS. 1 and 4, if desired.

The computing environment 502 can communicate with, or be accessed by, the network interfaces 512. The network interfaces 512 can include various types of network hardware and software for supporting communications between two or more computing devices including, but not limited to, the clients 506 and the application servers 508. It should be appreciated that the network interfaces 512 also may be utilized to connect to other types of networks and/or computer systems.

It should be understood that the distributed computing environment 500 described herein can provide any aspects of the software elements described herein with any number of virtual computing resources and/or other distributed computing functionality that can be configured to execute any aspects of the software components disclosed herein. According to various implementations of the concepts and technologies disclosed herein, the distributed computing environment 500 provides the software functionality described herein as a service to the clients 506. It should be understood that the clients 506 can include real or virtual machines including, but not limited to, server computers, web servers, personal computers, mobile computing devices, smart phones, and/or other devices. As such, various embodiments of the concepts and technologies disclosed herein enable any device configured to access the distributed computing environment 500 to utilize the functionality described herein for dial-based user interfaces.

Figure 6:
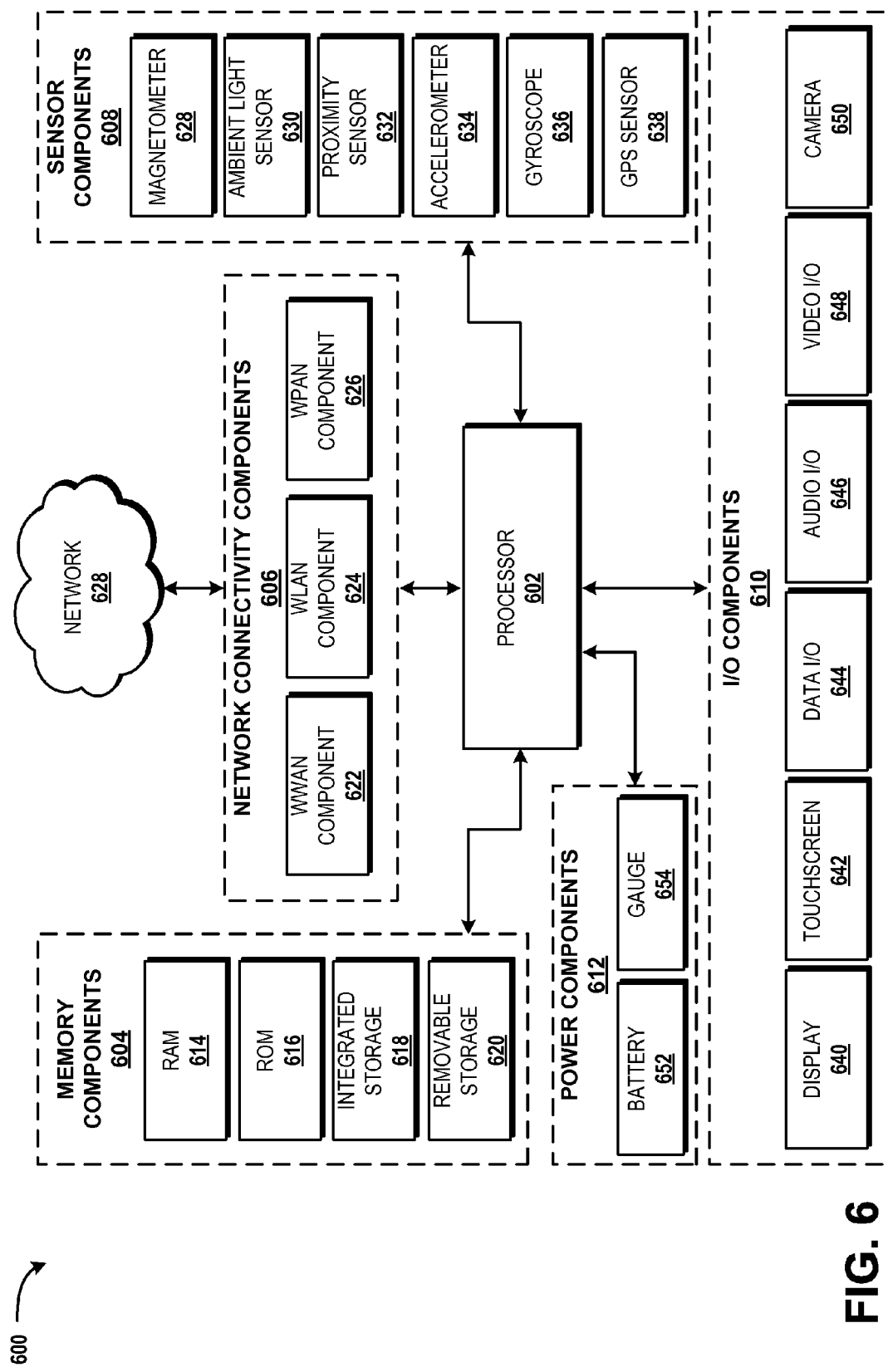
FIG. 6 is a computer architecture diagram illustrating a computing device architecture capable of implementing aspects of the embodiments presented herein.

Turning now to FIG. 6, an illustrative computing device architecture 600 for a computing device that is capable of executing various software components described herein for dial-based user interfaces. The computing device architecture 600 is applicable to computing devices that facilitate mobile computing due, in part, to form factor, wireless connectivity, and/or battery-powered operation. In some embodiments, the computing devices include, but are not limited to, mobile telephones, tablet devices, slate devices, portable video game devices, and the like. Moreover, the computing device architecture 600 is applicable to any of the clients 606 shown in FIG. 5. Furthermore, aspects of the computing device architecture 600 may be applicable to traditional desktop computers, portable computers (e.g., laptops, notebooks, ultra-portables, and netbooks), server computers, and other computer systems, such as described herein with reference to FIG. 4. For example, the single touch and multi-touch aspects disclosed herein below may be applied to desktop computers that utilize a touchscreen or some other touch-enabled device, such as a touch-enabled track pad or touch-enabled mouse.

The computing device architecture 600 illustrated in FIG. 6 includes a processor 602, memory components 604, network connectivity components 606, sensor components 608, input/output components 610, and power components 612. In the illustrated embodiment, the processor 602 is in communication with the memory components 604, the network connectivity components 606, the sensor components 608, the input/output ("I/O") components 610, and the power components 612. Although no connections are shown between the individuals components illustrated in FIG. 6, the components can interact to carry out device functions. In some embodiments, the components are arranged so as to communicate via one or more busses (not shown).

The processor 602 includes a central processing unit ("CPU") configured to process data, execute computer-executable instructions of one or more application programs, and communicate with other components of the computing device architecture 600 in order to perform various functionality described herein. The processor 602 may be utilized to execute aspects of the software components presented herein and, particularly, those that utilize, at least in part, a touch-enabled input.

In some embodiments, the processor 602 includes a graphics processing unit ("GPU") configured to accelerate operations performed by the CPU, including, but not limited to, operations performed by executing general-purpose scientific and engineering computing applications, as well as graphics-intensive computing applications such as high resolution video (e.g., 720P, 1080P, and greater), video games, three-dimensional ("3D") modeling applications, and the like. In some embodiments, the processor 602 is configured to communicate with a discrete GPU (not shown). In any case, the CPU and GPU may be configured in accordance with a co-processing CPU/GPU computing model, wherein the sequential part of an application executes on the CPU and the computationally-intensive part is accelerated by the GPU.

In some embodiments, the processor 602 is, or is included in, a system-on-chip ("SoC") along with one or more of the other components described herein below. For example, the SoC may include the processor 602, a GPU, one or more of the network connectivity components 606, and one or more of the sensor components 608. In some embodiments, the processor 602 is fabricated, in part, utilizing a package-on-package ("PoP") integrated circuit packaging technique. Moreover, the processor 602 may be a single core or multi-core processor.

The processor 602 may be created in accordance with an ARM architecture, available for license from ARM HOLDINGS of Cambridge, United Kingdom. Alternatively, the processor 602 may be created in accordance with an x86 architecture, such as is available from INTEL CORPORATION of Mountain View, Calif. and others. In some embodiments, the processor 602 is a SNAPDRAGON SoC, available from QUALCOMM of San Diego, Calif., a TEGRA SoC, available from NVIDIA of Santa Clara, Calif., a HUMMINGBIRD SoC, available from SAMSUNG of Seoul, South Korea, an Open Multimedia Application Platform ("OMAP") SoC, available from TEXAS INSTRUMENTS of Dallas, Tex., a customized version of any of the above SoCs, or a proprietary SoC.

The memory components 604 include a random access memory ("RAM") 614, a read-only memory ("ROM") 616, an integrated storage memory ("integrated storage") 618, and a removable storage memory ("removable storage") 620. In some embodiments, the RAM 614 or a portion thereof, the ROM 618 or a portion thereof, and/or some combination the RAM 614 and the ROM 618 is integrated in the processor 602. In some embodiments, the ROM 618 is configured to store a firmware, an operating system or a portion thereof (e.g., operating system kernel), and/or a bootloader to load an operating system kernel from the integrated storage 618 or the removable storage 620.

The integrated storage 618 can include a solid-state memory, a hard disk, or a combination of solid-state memory and a hard disk. The integrated storage 618 may be soldered or otherwise connected to a logic board upon which the processor 602 and other components described herein also may be connected. As such, the integrated storage 618 is integrated in the computing device. The integrated storage 618 is configured to store an operating system or portions thereof, application programs, data, and other software components described herein.

The removable storage 620 can include a solid-state memory, a hard disk, or a combination of solid-state memory and a hard disk. In some embodiments, the removable storage 620 is provided in lieu of the integrated storage 618. In other embodiments, the removable storage 620 is provided as additional optional storage. In some embodiments, the removable storage 620 is logically combined with the integrated storage 618 such that the total available storage is made available and shown to a user as a total combined capacity of the integrated storage 618 and the removable storage 620.

The removable storage 620 is configured to be inserted into a removable storage memory slot (not shown) or other mechanism by which the removable storage 620 is inserted and secured to facilitate a connection over which the removable storage 620 can communicate with other components of the computing device, such as the processor 602. The removable storage 620 may be embodied in various memory card formats including, but not limited to, PC card, CompactFlash card, memory stick, secure digital ("SD"), miniSD, microSD, universal integrated circuit card ("UICC") (e.g., a subscriber identity module ("SIM") or universal SIM ("USIM")), a proprietary format, or the like.

It can be understood that one or more of the memory components 604 can store an operating system. According to various embodiments, the operating system includes, but is not limited to, SYMBIAN OS from SYMBIAN LIMITED, WINDOWS MOBILE OS from Microsoft Corporation of Redmond, Wash., WINDOWS PHONE OS from Microsoft Corporation, WINDOWS from Microsoft Corporation, PALM WEBOS from Hewlett-Packard Company of Palo Alto, Calif., BLACKBERRY OS from Research In Motion Limited of Waterloo, Ontario, Canada, IOS from Apple Inc. of Cupertino, Calif., and ANDROID OS from Google Inc. of Mountain View, Calif. Other operating systems are contemplated.

The network connectivity components 606 include a wireless wide area network component ("WWAN component") 622, a wireless local area network component ("WLAN component") 624, and a wireless personal area network component ("WPAN component") 626. The network connectivity components 606 facilitate communications to and from a network 628, which may be a WWAN, a WLAN, or a WPAN. Although a single network 628 is illustrated, the network connectivity components 606 may facilitate simultaneous communication with multiple networks. For example, the network connectivity components 606 may facilitate simultaneous communications with multiple networks via one or more of a WWAN, a WLAN, or a WPAN.

In some embodiments, the functionality of the network 628 is provided by the network 104 and/or the network 504. In other embodiments, the network 628 includes the network 104 and/or the network 504. In yet other embodiments, the network 628 provides access to the network 104 and/or the network 504.

The network 628 may be a WWAN, such as a mobile telecommunications network utilizing one or more mobile telecommunications technologies to provide voice and/or data services to a computing device utilizing the computing device architecture 600 via the WWAN component 622. The mobile telecommunications technologies can include, but are not limited to, Global System for Mobile communications ("GSM"), Code Division Multiple Access ("CDMA") ONE, CDMA2000, Universal Mobile Telecommunications System ("UMTS"), Long Term Evolution ("LTE"), and Worldwide Interoperability for Microwave Access ("WiMAX"). Moreover, the network 628 may utilize various channel access methods (which may or may not be used by the aforementioned standards) including, but not limited to, Time Division Multiple Access ("TDMA"), Frequency Division Multiple Access ("FDMA"), CDMA, wideband CDMA ("W-CDMA"), Orthogonal Frequency Division Multiplexing ("OFDM"), Space Division Multiple Access ("SDMA"), and the like. Data communications may be provided using General Packet Radio Service ("GPRS"), Enhanced Data rates for Global Evolution ("EDGE"), the High-Speed Packet Access ("HSPA") protocol family including High-Speed Downlink Packet Access ("HSDPA"), Enhanced Uplink ("EUL") or otherwise termed High-Speed Uplink Packet Access ("HSUPA"), Evolved HSPA ("HSPA+"), LTE, and various other current and future wireless data access standards. The network 628 may be configured to provide voice and/or data communications with any combination of the above technologies. The network 628 may be configured to or adapted to provide voice and/or data communications in accordance with future generation technologies.

In some embodiments, the WWAN component 622 is configured to provide dual-multi-mode connectivity to the network 628. For example, the WWAN component 622 may be configured to provide connectivity to the network 628, wherein the network 628 provides service via GSM and UMTS technologies, or via some other combination of technologies. Alternatively, multiple WWAN components 622 may be utilized to perform such functionality, and/or provide additional functionality to support other non-compatible technologies (i.e., incapable of being supported by a single WWAN component). The WWAN component 622 may facilitate similar connectivity to multiple networks (e.g., a UMTS network and an LTE network).

The network 628 may be a WLAN operating in accordance with one or more Institute of Electrical and Electronic Engineers ("IEEE") 802.11 standards, such as IEEE 802.11a, 8020.11b, 802.11g, 802.11n, and/or future 802.11 standard (referred to herein collectively as WI-FI). Draft 802.11 standards are also contemplated. In some embodiments, the WLAN is implemented utilizing one or more wireless WI-FI access points. In some embodiments, one or more of the wireless WI-FI access points are another computing device with connectivity to a WWAN that are functioning as a WI-FI hotspot. The WLAN component 624 is configured to connect to the network 628 via the WI-FI access points. Such connections may be secured via various encryption technologies including, but not limited, WI-FI Protected Access ("WPA"), WPA2, Wired Equivalent Privacy ("WEP"), and the like.

The network 628 may be a WPAN operating in accordance with Infrared Data Association ("IrDA"), BLUETOOTH, wireless Universal Serial Bus ("USB"), Z-Wave, ZIGBEE, or some other short-range wireless technology. In some embodiments, the WPAN component 626 is configured to facilitate communications with other devices, such as peripherals, computers, or other computing devices via the WPAN.

The sensor components 608 include a magnetometer 628, an ambient light sensor 630, a proximity sensor 632, an accelerometer 634, a gyroscope 636, and a Global Positioning System sensor ("GPS sensor") 638. It is contemplated that other sensors, such as, but not limited to, temperature sensors or shock detection sensors, also may be incorporated in the computing device architecture 600.

The magnetometer 628 is configured to measure the strength and direction of a magnetic field. In some embodiments the magnetometer 628 provides measurements to a compass application program stored within one of the memory components 604 in order to provide a user with accurate directions in a frame of reference including the cardinal directions, north, south, east, and west. Similar measurements may be provided to a navigation application program that includes a compass component. Other uses of measurements obtained by the magnetometer 628 are contemplated.

The ambient light sensor 630 is configured to measure ambient light. In some embodiments, the ambient light sensor 630 provides measurements to an application program stored within one of the memory components 604 in order to automatically adjust the brightness of a display (described below) to compensate for low-light and high-light environments. Other uses of measurements obtained by the ambient light sensor 630 are contemplated.

The proximity sensor 632 is configured to detect the presence of an object or thing in proximity to the computing device without direct contact. In some embodiments, the proximity sensor 632 detects the presence of a user's body (e.g., the user's face) and provides this information to an application program stored within one of the memory components 604 that utilizes the proximity information to enable or disable some functionality of the computing device. For example, a telephone application program may automatically disable a touchscreen (described below) in response to receiving the proximity information so that the user's face does not inadvertently end a call or enable/disable other functionality within the telephone application program during the call. Other uses of proximity as detected by the proximity sensor 628 are contemplated.

The accelerometer 634 is configured to measure proper acceleration. In some embodiments, output from the accelerometer 634 is used by an application program as an input mechanism to control some functionality of the application program. For example, the application program may be a video game in which a character, a portion thereof, or an object is moved or otherwise manipulated in response to input received via the accelerometer 634. In some embodiments, output from the accelerometer 634 is provided to an application program for use in switching between landscape and portrait modes, calculating coordinate acceleration, or detecting a fall. Other uses of the accelerometer 634 are contemplated.

The gyroscope 636 is configured to measure and maintain orientation. In some embodiments, output from the gyroscope 636 is used by an application program as an input mechanism to control some functionality of the application program. For example, the gyroscope 636 can be used for accurate recognition of movement within a 3D environment of a video game application or some other application. In some embodiments, an application program utilizes output from the gyroscope 636 and the accelerometer 634 to enhance control of some functionality of the application program. Other uses of the gyroscope 636 are contemplated.

The GPS sensor 638 is configured to receive signals from GPS satellites for use in calculating a location. The location calculated by the GPS sensor 638 may be used by any application program that requires or benefits from location information. For example, the location calculated by the GPS sensor 638 may be used with a navigation application program to provide directions from the location to a destination or directions from the destination to the location. Moreover, the GPS sensor 638 may be used to provide location information to an external location-based service, such as E911 service. The GPS sensor 638 may obtain location information generated via WI-FI, WIMAX, and/or cellular triangulation techniques utilizing one or more of the network connectivity components 606 to aid the GPS sensor 638 in obtaining a location fix. The GPS sensor 638 may also be used in Assisted GPS ("A-GPS") systems.

The I/O components 610 include a display 640, a touchscreen 642, a data I/O interface component ("data I/O") 644, an audio I/O interface component ("audio I/O") 646, a video I/O interface component ("video I/O") 648, and a camera 650. In some embodiments, the display 640 and the touchscreen 642 are combined. In some embodiments two or more of the data I/O component 644, the audio I/O component 646, and the video I/O component 648 are combined. The I/O components 610 may include discrete processors configured to support the various interfaces described below, or may include processing functionality built-in to the processor 602.

The display 640 is an output device configured to present information in a visual form. In particular, the display 640 may present graphical user interface ("GUI") elements, text, images, video, notifications, virtual buttons, virtual keyboards, messaging data, Internet content, device status, time, date, calendar data, preferences, map information, location information, and any other information that is capable of being presented in a visual form. In some embodiments, the display 640 is a liquid crystal display ("LCD") utilizing any active or passive matrix technology and any backlighting technology (if used). In some embodiments, the display 640 is an organic light emitting diode ("OLED") display. Other display types are contemplated.

The touchscreen 642 is an input device configured to detect the presence and location of a touch. The touchscreen 642 may be a resistive touchscreen, a capacitive touchscreen, a surface acoustic wave touchscreen, an infrared touchscreen, an optical imaging touchscreen, a dispersive signal touchscreen, an acoustic pulse recognition touchscreen, or may utilize any other touchscreen technology. In some embodiments, the touchscreen 642 is incorporated on top of the display 640 as a transparent layer to enable a user to use one or more touches to interact with objects or other information presented on the display 640. In other embodiments, the touchscreen 642 is a touch pad incorporated on a surface of the computing device that does not include the display 640. For example, the computing device may have a touchscreen incorporated on top of the display 640 and a touch pad on a surface opposite the display 640.

In some embodiments, the touchscreen 642 is a single-touch touchscreen. In other embodiments, the touchscreen 642 is a multi-touch touchscreen. In some embodiments, the touchscreen 642 is configured to detect discrete touches, single touch gestures, and/or multi-touch gestures. These are collectively referred to herein as gestures for convenience. Several gestures will now be described. It should be understood that these gestures are illustrative and are not intended to limit the scope of the appended claims. Moreover, the described gestures, additional gestures, and/or alternative gestures may be implemented in software for use with the touchscreen 642. As such, a developer may create gestures that are specific to a particular application program.

In some embodiments, the touchscreen 642 supports a tap gesture in which a user taps the touchscreen 642 once on an item presented on the display 640. The tap gesture may be used for various reasons including, but not limited to, opening or launching whatever the user taps. In some embodiments, the touchscreen 642 supports a double tap gesture in which a user taps the touchscreen 642 twice on an item presented on the display 640. The double tap gesture may be used for various reasons including, but not limited to, zooming in or zooming out in stages. In some embodiments, the touchscreen 642 supports a tap and hold gesture in which a user taps the touchscreen 642 and maintains contact for at least a pre-defined time. The tap and hold gesture may be used for various reasons including, but not limited to, opening a context-specific menu.

In some embodiments, the touchscreen 642 supports a pan gesture in which a user places a finger on the touchscreen 642 and maintains contact with the touchscreen 642 while moving the finger on the touchscreen 642. The pan gesture may be used for various reasons including, but not limited to, moving through screens, images, or menus at a controlled rate. Multiple finger pan gestures are also contemplated. In some embodiments, the touchscreen 642 supports a flick gesture in which a user swipes a finger in the direction the user wants the screen to move. The flick gesture may be used for various reasons including, but not limited to, scrolling horizontally or vertically through menus or pages. In some embodiments, the touchscreen 642 supports a pinch and stretch gesture in which a user makes a pinching motion with two fingers (e.g., thumb and forefinger) on the touchscreen 642 or moves the two fingers apart. The pinch and stretch gesture may be used for various reasons including, but not limited to, zooming gradually in or out of a website, map, or picture.

Although the above gestures have been described with reference to the use one or more fingers for performing the gestures, other appendages such as toes or objects such as styluses may be used to interact with the touchscreen 642. As such, the above gestures should be understood as being illustrative and should not be construed as being limiting in any way. In addition, it should be noted that the gestures described above with reference to FIGS. 1-3M also can be supported by the touchscreen 642.

The data I/O interface component 644 is configured to facilitate input of data to the computing device and output of data from the computing device. In some embodiments, the data I/O interface component 644 includes a connector configured to provide wired connectivity between the computing device and a computer system, for example, for synchronization operation purposes. The connector may be a proprietary connector or a standardized connector such as USB, micro-USB, mini-USB, or the like. In some embodiments, the connector is a dock connector for docking the computing device with another device such as a docking station, audio device (e.g., a digital music player), or video device.

The audio I/O interface component 646 is configured to provide audio input and/or output capabilities to the computing device. In some embodiments, the audio I/O interface component 644 includes a microphone configured to collect audio signals. In some embodiments, the audio I/O interface component 644 includes a headphone jack configured to provide connectivity for headphones or other external speakers. In some embodiments, the audio interface component 646 includes a speaker for the output of audio signals. In some embodiments, the audio I/O interface component 644 includes an optical audio cable out.

The video I/O interface component 648 is configured to provide video input and/or output capabilities to the computing device. In some embodiments, the video I/O interface component 648 includes a video connector configured to receive video as input from another device (e.g., a video media player such as a DVD or BLURAY player) or send video as output to another device (e.g., a monitor, a television, or some other external display). In some embodiments, the video I/O interface component 648 includes a High-Definition Multimedia Interface ("HDMI"), mini-HDMI, micro-HDMI, DisplayPort, or proprietary connector to input/output video content. In some embodiments, the video I/O interface component 648 or portions thereof is combined with the audio I/O interface component 646 or portions thereof.

The camera 650 can be configured to capture still images and/or video. The camera 650 may utilize a charge coupled device ("CCD") or a complementary metal oxide semiconductor ("CMOS") image sensor to capture images. In some embodiments, the camera 650 includes a flash to aid in taking pictures in low-light environments. Settings for the camera 650 may be implemented as hardware or software buttons.

Although not illustrated, one or more hardware buttons may also be included in the computing device architecture 600. The hardware buttons may be used for controlling some operational aspect of the computing device. The hardware buttons may be dedicated buttons or multi-use buttons. The hardware buttons may be mechanical or sensor-based.

The illustrated power components 612 include one or more batteries 652, which can be connected to a battery gauge 654. The batteries 652 may be rechargeable or disposable. Rechargeable battery types include, but are not limited to, lithium polymer, lithium ion, nickel cadmium, and nickel metal hydride. Each of the batteries 652 may be made of one or more cells.

The battery gauge 654 can be configured to measure battery parameters such as current, voltage, and temperature. In some embodiments, the battery gauge 654 is configured to measure the effect of a battery's discharge rate, temperature, age and other factors to predict remaining life within a certain percentage of error. In some embodiments, the battery gauge 654 provides measurements to an application program that is configured to utilize the measurements to present useful power management data to a user. Power management data may include one or more of a percentage of battery used, a percentage of battery remaining, a battery condition, a remaining time, a remaining capacity (e.g., in watt hours), a current draw, and a voltage.

The power components 612 may also include a power connector, which may be combined with one or more of the aforementioned I/O components 610. The power components 612 may interface with an external power system or charging equipment via a power I/O component 642.

Based on the foregoing, it should be appreciated that technologies for dial-based user interfaces have been disclosed herein. Although the subject matter presented herein has been described in language specific to computer structural features, methodological and transformative acts, specific computing machinery, and computer readable media, it is to be understood that the invention defined in the appended claims is not necessarily limited to the specific features, acts, or media described herein. Rather, the specific features, acts and mediums are disclosed as example forms of implementing the claims.

The subject matter described above is provided by way of illustration only and should not be construed as limiting. Various modifications and changes may be made to the subject matter described herein without following the example embodiments and applications illustrated and described, and without departing from the true spirit and scope of the present invention, which is set forth in the following claims.

I claim:

1. A computer-implemented method for interacting with a dial-based menu user interface, the computer-implemented method comprising performing computer-implemented operations for:

presenting the dial-based menu user interface, the dial-based menu user interface comprising a user interface control, the user interface control comprising a plurality of radially arranged soft buttons;

detecting input associated with a first soft button of the plurality of radially arranged soft buttons;

analyzing the input to determine a command; and in response to determining that the first soft button of the plurality of radially arranged soft buttons is associated with an option having a numeric value:

presenting a numeric adjustment control on the dial-based menu user interface to indicate adjustment of the numeric value, the numeric adjustment control comprising a scale arranged radially around the dial-based menu user interface and a needle proximate the scale, determining that a contact point has been moved away from a rotation axis, in response to determining that the contact point has been moved away from the rotation axis, enabling a precision adjustment mode for further adjusting the numeric value using the numeric adjustment control, and adjusting the numeric value in the precision adjustment mode by moving the scale relative to the needle, at least in part in response to detecting rotation of the contact point around the rotation axis.

2. The method of claim 1, further comprising:
modifying the first soft button of the plurality of radially arranged soft buttons to indicate selection of the first soft button of the plurality of radially arranged soft buttons.

3. The method of claim 2, wherein the scale arranged radially around the dial-based menu user interface displays a value for the numeric value.

4. The method of claim 1, wherein detecting the input comprises detecting a multi-touch input at a multi-touch-sensitive device comprising detecting multiple contact points associated with the multi-touch input at a multi-touch display and detecting a movement of at least one of the contact points.

5. The method of claim 4, wherein the movement comprises a rotation of the at least one of the contact points about the rotation axis associated with the dial-based menu user interface.

6. The method of claim 4, wherein the movement comprises movement of the at least one of the contact points and holding stationary another of the contact points.

7. The method of claim 5, wherein the rotation axis is determined by calculating a midpoint between at least two contact points.

8. The method of claim 1, further comprising modifying the dial-based menu user interface to present a root menu in response to selecting the first soft button of the plurality of radially arranged soft buttons.

9. The method of claim 1, wherein the precision adjustment mode comprises increasing a radius of the at least one contact point.

10. The method of claim 1, wherein presenting the dial-based menu user interface comprises presenting at least two dial-based menu user interfaces.

11. A computer storage medium having computer readable instructions stored thereupon that, when executed by a computer, cause the computer to:

present, at a user device, a dial-based menu user interface comprising a user interface control, the user interface control comprising a plurality of radially arranged soft buttons;

detect, at the user device, input associated with a first soft button of the plurality of radially arranged soft buttons;

analyze the input to determine a command associated with the input;

in response to determining that the first soft button of the plurality of radially arranged soft buttons is associated with an option having a numeric value, present a numeric adjustment control on the dial-based menu user interface to indicate adjustment of the numeric value, the numeric adjustment control comprising a scale arranged radially around the dial-based menu user interface;

detect a first contact at a first location on the display, the first location being spaced from a rotation axis of the dial-based menu user interface;

detect a second contact at a second location on the display;

determine a movement of the second contact from the second location, relative to the first location;

determine an angle of rotation corresponding to the movement of the second contact; and modify the dial-based menu user interface control by adjusting the numeric adjustment control in accordance with the angle of rotation.

12. The computer storage medium of claim 11, wherein presenting the numeric adjustment control further comprises displaying a pointer for pointing at a numeric value associated with the numeric adjustment control.

13. The computer storage medium of claim 11, wherein the first contact and the second contact are
associated with a multi-touch input at a multi-touch display.

14. The computer storage medium of claim 13, wherein the movement comprises a rotation of the at least one of the contact points about the rotation axis associated with the dial-based menu user interface, and wherein detecting the input further comprises determining a rotation axis associated with the movement and determining a radius between the rotation axis and at least one of the multiple contact points.

15. The computer storage medium of claim 11, wherein the user device presents at least two dial-based menu user interfaces.

16. The computer storage medium of claim 11, wherein the precision adjustment mode comprises increasing a radius of the at least one contact point.

17. An apparatus comprising:
a display;
a processor; and
a memory communicatively coupled to the processor having instructions stored thereupon which, when executed by the processor, cause the apparatus to:
present, on the display, a dial-based menu user interface comprising a user interface control,
detect selection of the user interface control,
modify the dial-based menu user interface to indicate selection of the user interface control,
determine that the user interface control is associated with an option having a numeric value,
present a numeric adjustment control on the dial-based menu user interface to indicate adjustment of the numeric value, the numeric adjustment control comprising a scale arranged radially around the dial-based menu user interface and a needle proximate the scale, detect input at the dial-based menu user interface comprising at least one contact point, in response to determining that the at least one contact point moved away from a center of the dial-based menu user interface, enable a precision adjustment mode for further adjusting the numeric value using the numeric adjustment control, and adjust the numeric value in the precision adjustment mode by moving the scale relative to the needle, at least in part in response to detecting rotation of the at least one contact point around the rotation axis.

18. The apparatus of claim 17, wherein the display comprises a multi-touch display, and wherein detecting the input comprises detecting multiple contact points associated with a multi-touch input at the multi-touch display, and detecting a movement of at least one of the contact points.

19. The apparatus of claim 18, wherein the movement comprises a rotation of the at least one of the contact points about a rotation axis associated with the dial-based menu user interface, and wherein detecting the input further comprises determining a rotation axis associated with the movement and determining a radius between the rotation axis and at least one of the multiple contact points.

20. The apparatus of claim 17, wherein the display presents at least two dial-based menu user interfaces.

\* \* \* \* \*